US012682160B2

(12) United States Patent
Dhindsa et al.

(10) Patent No.: US 12,682,160 B2
(45) Date of Patent: Jul. 14, 2026

(54) DOCUMENT COMPLIANCE EVALUATION USING A LARGE LANGUAGE MODEL

(71) Applicant: Insight Direct USA, Inc., Chandler, AZ (US)

(72) Inventors: Dilbagh Singh Dhindsa, Pune (IN); Catherine Jean Snell, Durham, NC (US)

(73) Assignee: Insight Direct USA, Inc., Chandler, AZ (US)

( * ) Notice: Subject to any disclaimer, the term of this patent is extended or adjusted under 35 U.S.C. 154(b) by 90 days.

(21) Appl. No.: 18/657,005

(22) Filed: May 7, 2024

(65) Prior Publication Data

US 2025/0348664 A1 Nov. 13, 2025

(51) Int. Cl.
G06F 40/20 (2020.01)
G06F 40/186 (2020.01)

(52) U.S. Cl.
CPC ............ G06F 40/20 (2020.01); G06F 40/186 (2020.01)

(58) Field of Classification Search
CPC ............................... G06F 40/20; G06F 40/186
See application file for complete search history.

(56) References Cited

U.S. PATENT DOCUMENTS

| | | | |
|---|---|---|---|
| 5,963,940 A | 10/1999 | Liddy et al. | |
| 6,901,399 B1 | 5/2005 | Corston et al. | |
| 7,346,490 B2 | 3/2008 | Fass et al. | |
| 8,527,534 B2 | 9/2013 | Wang et al. | |
| 8,645,124 B2 | 2/2014 | Karov Zangvil | |
| 9,892,111 B2 | 2/2018 | Danielyan et al. | |
| 10,037,317 B1 | 7/2018 | Kaeser et al. | |
| 10,713,291 B2 | 7/2020 | Tata et al. | |
| 10,733,366 B2 | 8/2020 | Yawn et al. | |
| 11,023,503 B2 | 6/2021 | Satterfield et al. | |
| 11,334,722 B2 | 5/2022 | Ng et al. | |
| 11,361,151 B1 | 6/2022 | Guberman et al. | |
| 11,734,517 B1 | 8/2023 | Abi-Akl et al. | |
| 11,748,577 B1 | 9/2023 | Aberle | |
| 2006/0155530 A1 | 7/2006 | Altevogt et al. | |
| 2016/0078102 A1 | 3/2016 | Crouch et al. | |

(Continued)

FOREIGN PATENT DOCUMENTS

| | | |
|---|---|---|
| EP | 0475964 B1 | 5/1997 |
| WO | 2021055102 A1 | 3/2021 |

*Primary Examiner* — Mahelet Shiberou
(74) *Attorney, Agent, or Firm* — Kinney & Lange, P.A.

(57) ABSTRACT

A method of evaluating a first document for compliance is disclosed herein that includes separating the first document into multiple chunks of text and evaluating a first chunk to determine whether the first chunk is a standard chunk type or a nonstandard chunk type. In response to the first chunk being a standard chunk type, the method can include determining a purpose of the first chunk, retrieving a first template chunk having a similar purpose, and determining a first similarity score representative of a similarity between the first chunk and the first template chunk. In response to the first chunk being a nonstandard chunk type, the method can include providing the first chunk to a first large language model, determining (by the first large language model) a first hallucination score, and formulating a compliance score dependent on the first similarity score or the first hallucination score.

18 Claims, 5 Drawing Sheets

(56)         References Cited

U.S. PATENT DOCUMENTS

| | | | |
|---|---|---|---|
| 2019/0347284 A1* | 11/2019 | Roman | G06F 16/93 |
| 2020/0327151 A1* | 10/2020 | Coquard | G06F 16/3347 |
| 2023/0315981 A1* | 10/2023 | Belhe | G06F 40/166 |
| | | | 704/9 |
| 2024/0273306 A1 | 8/2024 | Somaiya et al. | |
| 2024/0419912 A1 | 12/2024 | Somech et al. | |
| 2024/0428005 A1 | 12/2024 | Abraham et al. | |
| 2025/0061279 A1* | 2/2025 | deLevie | G06F 40/131 |
| 2025/0156639 A1* | 5/2025 | Sinha | G06V 30/416 |
| 2025/0211549 A1 | 6/2025 | Arunachalam et al. | |

* cited by examiner

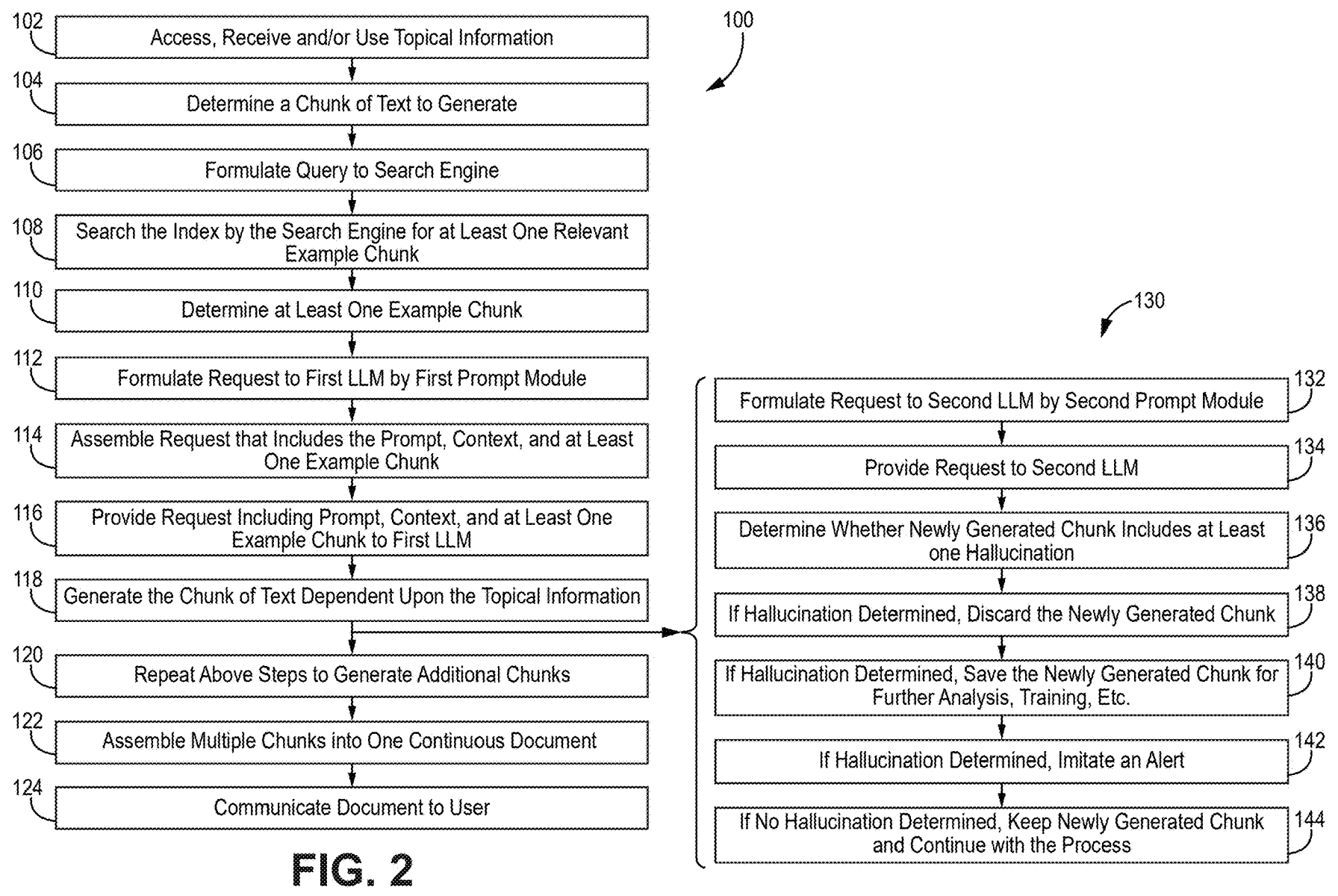

100

- 102 Access, Receive and/or Use Topical Information
- 104 Determine a Chunk of Text to Generate
- 106 Formulate Query to Search Engine
- 108 Search the Index by the Search Engine for at Least One Relevant Example Chunk
- 110 Determine at Least One Example Chunk
- 112 Formulate Request to First LLM by First Prompt Module
- 114 Assemble Request that Includes the Prompt, Context, and at Least One Example Chunk
- 116 Provide Request Including Prompt, Context, and at Least One Example Chunk to First LLM
- 118 Generate the Chunk of Text Dependent Upon the Topical Information
- 120 Repeat Above Steps to Generate Additional Chunks
- 122 Assemble Multiple Chunks into One Continuous Document
- 124 Communicate Document to User

130

- 132 Formulate Request to Second LLM by Second Prompt Module
- 134 Provide Request to Second LLM
- 136 Determine Whether Newly Generated Chunk Includes at Least one Hallucination
- 138 If Hallucination Determined, Discard the Newly Generated Chunk
- 140 If Hallucination Determined, Save the Newly Generated Chunk for Further Analysis, Training, Etc.
- 142 If Hallucination Determined, Imitate an Alert
- 144 If No Hallucination Determined, Keep Newly Generated Chunk and Continue with the Process

FIG. 2

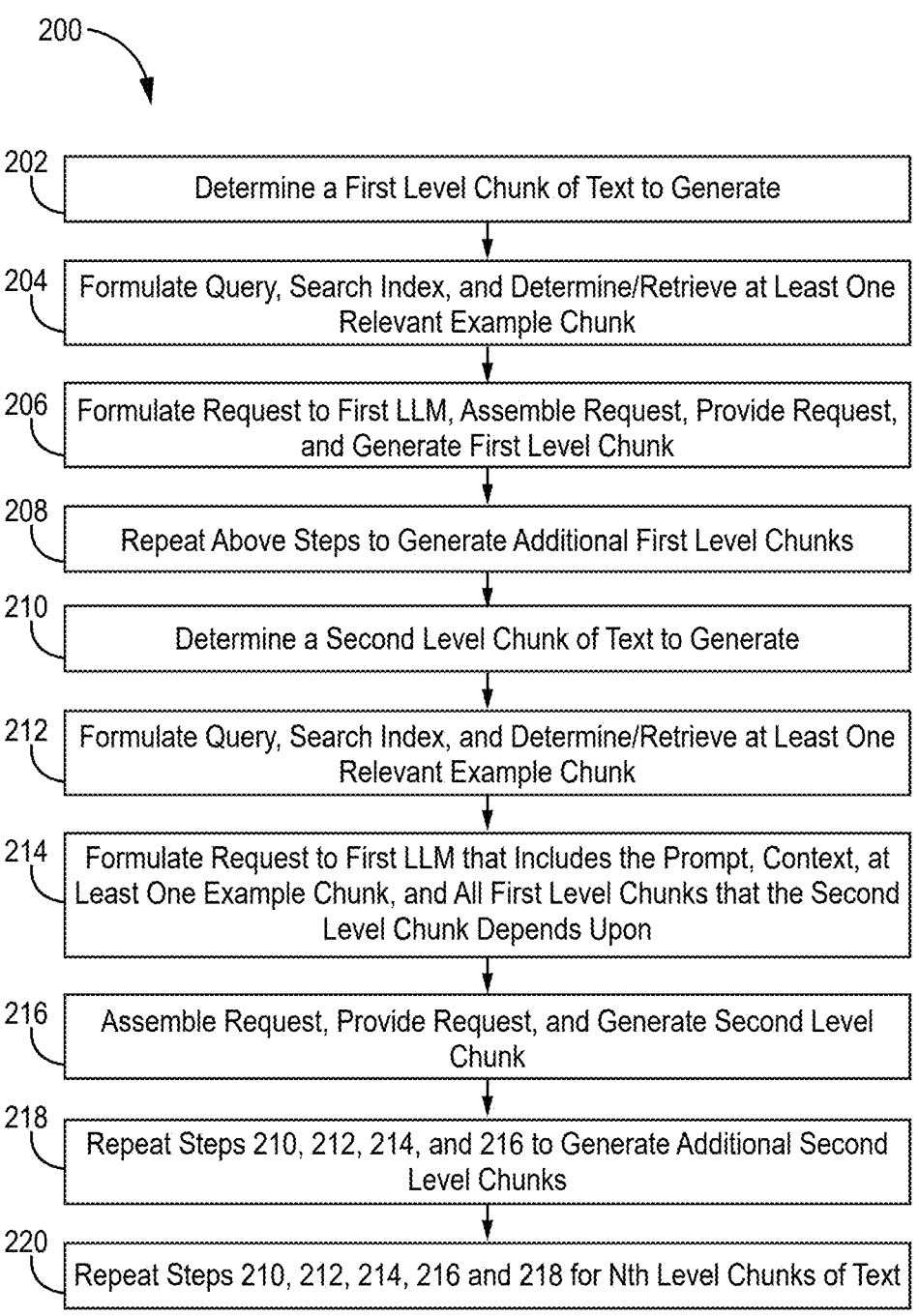

200

202 — Determine a First Level Chunk of Text to Generate

204 — Formulate Query, Search Index, and Determine/Retrieve at Least One Relevant Example Chunk 206 — Formulate Request to First LLM, Assemble Request, Provide Request, and Generate First Level Chunk 208 — Repeat Above Steps to Generate Additional First Level Chunks 210 — Determine a Second Level Chunk of Text to Generate 212 — Formulate Query, Search Index, and Determine/Retrieve at Least One Relevant Example Chunk 214 — Formulate Request to First LLM that Includes the Prompt, Context, at Least One Example Chunk, and All First Level Chunks that the Second Level Chunk Depends Upon 216 — Assemble Request, Provide Request, and Generate Second Level Chunk 218 — Repeat Steps 210, 212, 214, and 216 to Generate Additional Second Level Chunks 220 — Repeat Steps 210, 212, 214, 216 and 218 for Nth Level Chunks of Text

FIG. 3

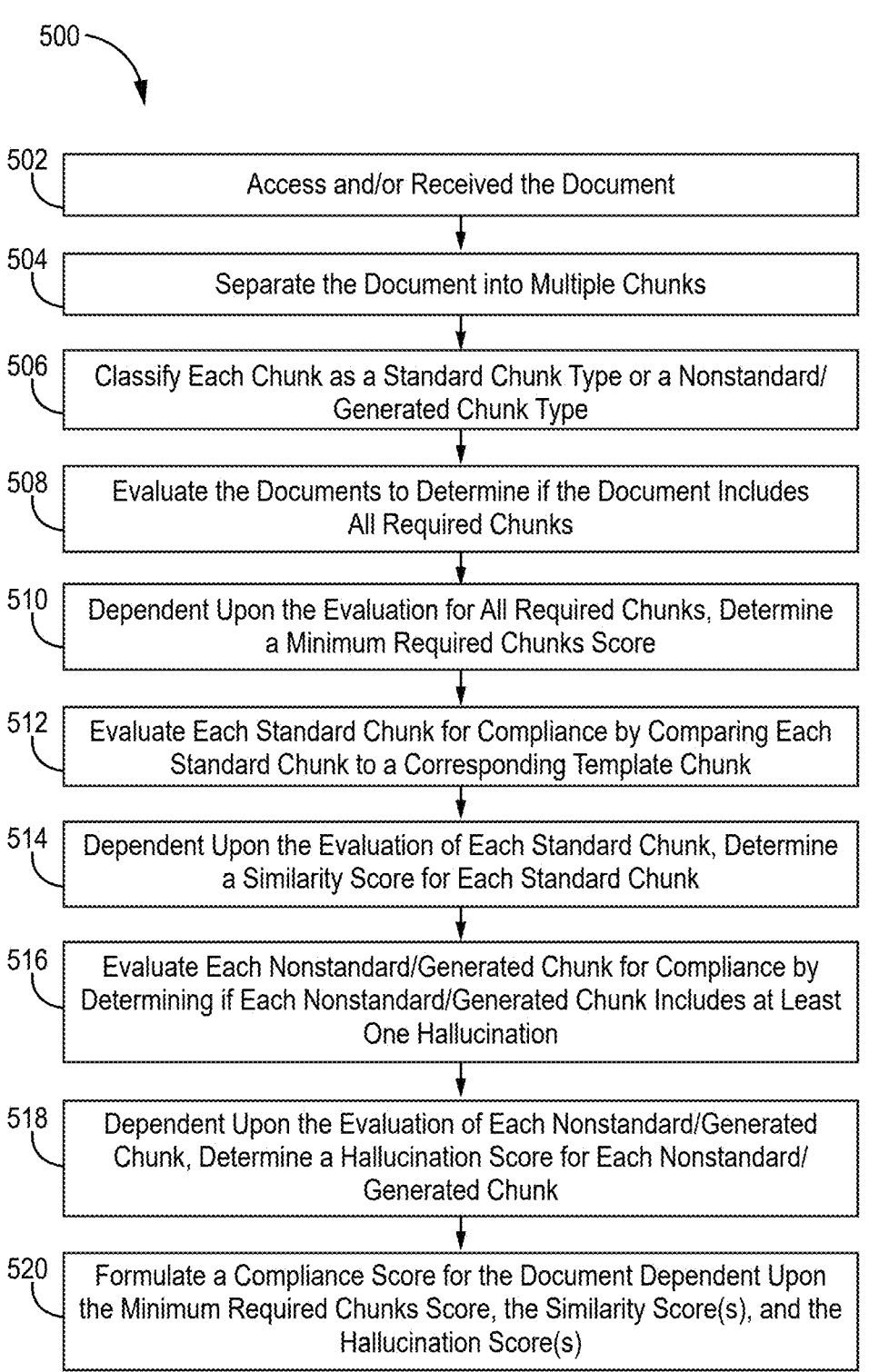

500

502 — Access and/or Received the Document

504 — Separate the Document into Multiple Chunks

506 — Classify Each Chunk as a Standard Chunk Type or a Nonstandard/ Generated Chunk Type 508 — Evaluate the Documents to Determine if the Document Includes All Required Chunks 510 — Dependent Upon the Evaluation for All Required Chunks, Determine a Minimum Required Chunks Score 512 — Evaluate Each Standard Chunk for Compliance by Comparing Each Standard Chunk to a Corresponding Template Chunk 514 — Dependent Upon the Evaluation of Each Standard Chunk, Determine a Similarity Score for Each Standard Chunk 516 — Evaluate Each Nonstandard/Generated Chunk for Compliance by Determining if Each Nonstandard/Generated Chunk Includes at Least One Hallucination 518 — Dependent Upon the Evaluation of Each Nonstandard/Generated Chunk, Determine a Hallucination Score for Each Nonstandard/ Generated Chunk 520 — Formulate a Compliance Score for the Document Dependent Upon the Minimum Required Chunks Score, the Similarity Score(s), and the Hallucination Score(s)

FIG. 5

DOCUMENT COMPLIANCE EVALUATION USING A LARGE LANGUAGE MODEL

FIELD OF THE INVENTION

The disclosure relates generally to the evaluation of documents, such as statements of work (hereinafter, "SOW" or "SOWs"), and, in particular, to the determination whether a document is in compliance with standard language and practices, specified rules, preapproved templates/documents, general knowledge, industrial guidelines, and/or consistent information using a large language model.

BACKGROUND

The creation of textual documents can require knowledge and experience to ensure that the document includes all relevant information organized in a coherent and easy to understand manner. Additionally, as is the case with a contract or other document intending to state the relationship between two parties (such as a statement of work), the document should have specific sections defining the goals and obligations of the involved parties while also avoiding any confusing or impermissible terms and/or phrases. Moreover, the evaluation of those documents for compliance can require alternate and/or additional knowledge and experience to ensure the document does not include edits and/or information that is incorrect, impermissible, and/or missing. Thus, the creation and evaluation of such documents can be tedious and time consuming, resulting in errors when performed without the proper knowledge, experience, and information.

SUMMARY

A method of evaluating a first document for compliance is disclosed herein that includes separating the first document into multiple chunks of text and evaluating a first chunk of the multiple chunks of text to determine whether the first chunk is a standard chunk type or a nonstandard chunk type. In response to the first chunk being a standard chunk type, the method can include determining a purpose of the first chunk, retrieving a first template chunk having a similar purpose, and determining a first similarity score representative of a similarity between the first chunk and the first template chunk. In response to the first chunk being a nonstandard chunk type, the method can include providing the first chunk to a first large language model, prompting the first large language model to evaluate the first chunk for a hallucination, determining (by the first large language model) a first hallucination score representative of at least an amount of the first chunk that is a hallucination created when the first chunk was generated by another large language model, and formulating a compliance score dependent on the first similarity score or the first hallucination score with the compliance score being representative of a level of compliance of the first chunk.

BRIEF DESCRIPTION OF THE DRAWINGS

FIG. 2 is a method flow chart describing an example process for generating a document having multiple chunks of text and evaluating those chunks for hallucinations.

FIG. 3 is a method flow chart describing an example process for generating multiple chunks of text interdependent upon one another.

FIG. 5 is a method flow chart describing an example process for evaluating for compliance a document having multiple chunks of text.

Figure 1:
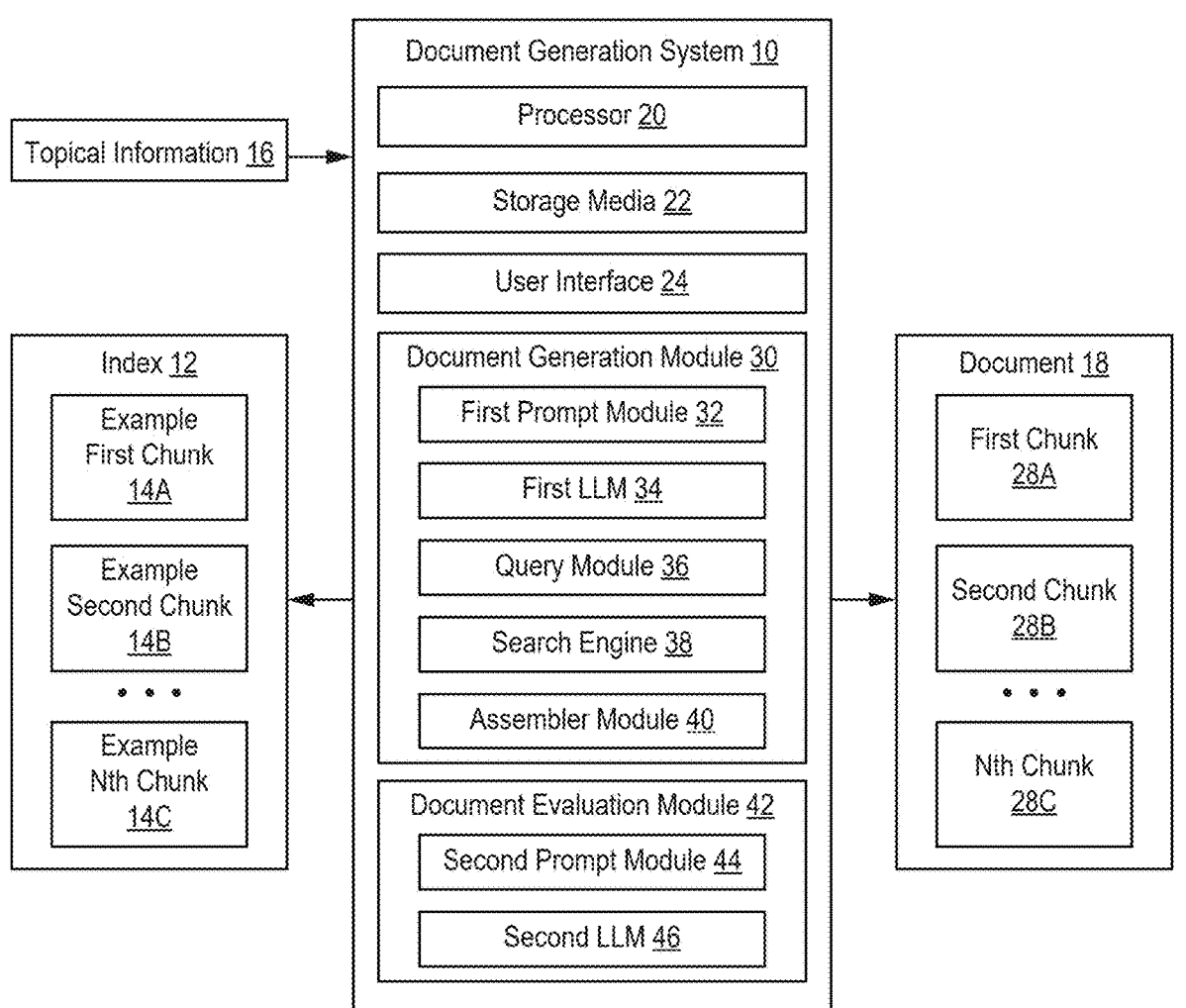
FIG. 1 is a block schematic diagram of an example document generation system.

While the above-identified figures set forth one or more examples of the present disclosure, other examples/embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and examples of the present invention may include features and components not specifically shown in the drawings.

DETAILED DESCRIPTION

A system and related processes are disclosed herein for generating a document, such as a statement of work (hereinafter, "SOW" or "SOWs"), having multiple chunks of text using a large language model and/or evaluating the chunks of text for hallucinations and/or compliance using the same or a different large language model and/or a similarity/cognitive search engine. In one example, the SOW is for development of a computer software program. The document can be generated dependent upon topical information provided by a user and/or the desired purpose of the document and/or of each chunk of the multiple chunks of text. The system and related processes include retrieving one or multiple example chunks of text relevant to a to-be-generated chunk from an index that includes multiple example chunks of text. At least one of those relevant example chunks can be provided to a large language model (hereinafter, "LLM") along with other information. The LLM can be configured to generate/determine the chunk of text dependent upon the topical information that accomplishes the desired purpose of the chunk as set out in the request provided to the LLM. The system and processes can be repeated multiple times for each chunk to generate a complete document having multiple chunks accomplishing differing purposes and having differing contents.

The system and processes can include an assembler module and/or other modules for assembling the chunks into a continuous document in an organized, coherent, and easy to understand manner. Additionally, the system and processes can include a prompt module that formulates the request that includes the prompt that states the desired purpose of the chunk of text to be generated, a context that provides information dependent upon the topical information, and/or the example chunks of text relevant to the chunk of text to be generated.

The system and processes can include evaluating each chunk (generated via the use of the LLM) for one or multiple hallucinations. Some LLMs can generate hallucinations, which is data/information that is not grounded in fact and/or is not responsive to the request. The system and processes can perform such an evaluation by providing the generated chunk, along with prompts, context, and/or topical information (and/or information dependent upon the topical information) to another LLM that asks the other LLM to evaluate the chunk of text for hallucinations. If the evaluation by the other LLM reveals/determines that the chunk of text includes at least one hallucination, the system and/or processes can include discarding the chunk, saving/cataloging the chunk, and/or performing other actions (such as initiating an alert that the chunk of text includes at least one hallucination). Additionally, the evaluation of the generated chunk for hallucinations can include formulating a hallucination score and/or providing that hallucination score to a user to inform the user as to the likelihood that the generated chunk includes at least one hallucination, the amount of generated chunk that is and/or includes a hallucination, and/or other information regarding the generated chunk and a potential hallucination therein.

Further, the system and processes can include generating chunks that are dependent and/or interdependent upon other, previously generated chunks (e.g., dependent upon newly generated chunks). For example, the system and processes can include generating a first chunk of text that includes (e.g., accomplishes the desired purpose) a scope of the project, and subsequent chunks of text for the same document as the scope of the project can be dependent upon the scope of the project chunk that has previously been generated. For example, the chunks dependent upon the scope of the project can be, for example, the project duration, assumptions, client responsibilities, deliverables, service description, and/or party roles. The system and/or processes can include determining the first, independent chunks of text to be generated (known as first level chunks), then determining the second level chunks of text that depend from the first level chunks, the third level chunks of text that depend from the second level chunks of text, and so on and so forth. This sequence in which the system and/or processes generate multiple levels of chunks of text can be very complex.

Additional and/or alterative to the document generation system described above, a document compliance evaluation system is described herein that can function in conjunction with the document generation system and/or be a separate and distinct system and/or processes. The document compliance evaluation system (shown and described with regards to FIG. 4) and the related processes (shown and described with regards to FIG. 5) can be configured to separate/divide the document into multiple chunks which can then each evaluated for compliance. The system and/or processes can include classifying each of the chunks as being a standard chunk type, which is a chunk that include standard language/content related to the purpose/type of document (e.g., the document is a SOW and the particular chunk is a legal clause describing dispute resolution), or as being a nonstandard/generated chunk type, which is a chunk that was at least partially generated by and/or with the use of an LLM. Additionally, a nonstandard/generated chunk type can be any chunk that is not classified a standard chunk type. Then, the system and/or processes can include evaluating each of the chunks for compliance. If the chunk is a standard chunk type, the compliance evaluation can include comparing that standard chunk to a similar, example/template standard chunk and determine whether there are any differences and, if so, how different the chunk is from the example/template chunk. If the chunk is a nonstandard/generated chunk type, the compliance evaluation can include evaluating that chunk for hallucinations using an LLM.

Moreover, the system and/or processes can include evaluating the document as a whole (or a portion of the document) to ensure that all chunks/sections are present. For example, the document can be compared to a template of the same document type (e.g., a SOW) to ensure that the document includes a section/chunk regarding deliverables. If the document does not include a deliverables section/chunk, the system and/or processes could flag the document as being noncompliant. The system and/or processes can determine a compliance/risk score dependent upon the compliance evaluations of each chunk. The compliance/risk score can be a combination of the similarity score (representative of the similarity between the standard chunks and the corresponding template chunks), the hallucination score (representative of the likelihood/amount of each chunk that is a hallucination), the minimum required chunks score (representative of the number/amount of chunks that should be in the document but are missing), and/or other compliance evaluations/factors. The compliance/risk score can be used by a user to determine whether the document and/or each chunk is satisfactory to use for the designated purpose (e.g., if the document is a SOW, whether the SOW is acceptable to be used by the user or if the user should edit the current SOW and/or formulate a new SOW). Additionally, the compliance/risk score can be used to trigger a review of the document by, for example, the legal department (if the document is a legal document, such as a contract and/or SOW). The features, functions, capabilities, and/or advantages of the disclosed document compliance evaluation system and processes are realized by reviewing the below disclosure.

FIG. 1 is a block schematic diagram of an example document generation system 10 (hereinafter referred to as "system 10"). System 10 can communicate with index 12 to access, receive, and/or otherwise use one or multiple example first chunks 14A, one or multiple second chunks 14B, and/or one or multiple example Nth chunks 14C (e.g., any number of example chunks collectively described herein as "example chunks 14"). Additionally, system 10 can access, receive, and/or otherwise use topical information 16 from sources external to system 10. System 10 can generate document 18 and/or provide document 18 to any location within and/or external to system 10, such as to a user. Document 18 can include first chunk 28A, second chunk 28B, and/or Nth chunk 28C (e.g., any number of chunks collectively described herein as "chunks 28"). Document 18 can include other information not expressly disclosed herein and/or can be generated in any physical and/or digital format, such as an electronic text document (e.g., a Word document), a PDF, and/or another format. System 10 can include, among other components not expressly disclosed herein, processor 20, storage media 22, and user interface 24 (which can be used to input topical information 16).

Further, system 10 can include document generation module 30, which can have first prompt module 32, first LLM 34, query module 36, search engine 38, and/or assembler module 40. System 10 can also include document evaluation module 42, which can have second prompt module 44 and/or second LLM 46. In other configurations, first LLM 34, search engine 38, and/or second LLM 46 can be separate and/or distinct from system 10 so as to be distant from and/or in communication with system 10. In some configurations, first LLM 34 and second LLM 46 can be the same large language model. Alternatively, first LLM 34 and second LLM 46 can be distinct and separate large language models. First LLM 34, second LLM 46, and search engine 38 can have a number of components and/or features not expressly disclosed herein, and can function in conjunction with and/or access the internet. Any of the components/systems shown in FIG. 1 can communicate with each other via any type of wired and wireless communication, including via the use of the internet. Any of the components/systems shown in FIG. 1 can communicate with each other via any type of wired and wireless communication, including via the use of the internet. In one example, the components/systems shown and described herein can communicate via a publisher/subscriber message bus and/or similar configurations.

FIG. 1 focuses on hardware components of document generation system 10, and is provided as an illustrative example of a general hardware system for performing the capabilities discussed herein. The components presented in FIG. 1, particularly including modules 30, 32, 36, 40, 42, and/or 44 can be omitted or replaced with analogous hardware and/or software in different architectures without departing from the scope and spirit of the present disclosure.

Document generation system 10 (and process 100 described with regards to FIG. 2 and process 200 described with regards to FIG. 3) can include other steps, components, modules, configurations, and/or features not expressly disclosed herein that are suitable for generating documents and/or evaluating documents for hallucinations, among other capabilities. For example, system 10 can include any number of digital/electronic storage media (e.g., storage media 22) for storing data, information, and/or executable instructions. System 10 can include any number of computer processors (e.g., processor 20) for performing tasks/instructions with regards to system 10, process 100, and/or process 200. Further, system 10 can allow for communication via wired or wireless communication methods between components of system 10 and/or between other components, systems, individuals/users, etc. distant from system 10. System 10 is described herein as including one or multiple "modules," which can be any hardware and/or software for performing the tasks, functionality, and/or capabilities described herein. These "modules" can be instantiated in dedicated hardware and/or software, and/or can be defined functionally and use shared hardware and/or software.

Additionally, system 10 can be a discrete assembly or be formed by one or more components capable of individually or collectively implementing the functionalities described herein. In some examples, system 10 can be implemented as a plurality of discrete circuitry subassemblies. In some examples, one or all components of system 10 can include and/or be implemented at least in part on a smartphone or tablet, among other options. In some examples, one or all components of system 10 can include and/or be implemented as downloadable software in the form of a mobile application. The mobile application can be implemented on a computing device, such as a personal computer, tablet, or smartphone, among other suitable devices. One or all components of system 10 can be considered to form a single computing device even when distributed across multiple component computing devices. System 10 can include a configuration in which one, some, or all of the functions described herein are performed by different components. System 10 can include various components for performing the above functions (as well as other functions described in this disclosure), such as processor 20, storage media 22, and/or user interface 24.

Document generation system 10 can access, receive, and/or otherwise use topical information 16. Topical information 16 can be provided to system 10, and/or topical information 16 can be entered/provided by a user via user interface 24 and/or by other means, such as by providing topical information 16 via a website on the internet. The location at which topical information 16 is entered/stored/provided can be in wired and/or wireless communication with document generation system 10. In one example, user interface 24 allows for a user to enter topical information 16 into various dialog boxes. Topical information 16 can be specific to the document 18 that is to be generated by system 10, and can include a project name, a project identification number, a client name, a client industry, a client description, a document type, project challenges, a project duration, project priorities, project special considerations, project service type(s), a delivery type, and/or a delivery location. Topical information 16 can include other information, such as the name/type and number of chunks 28 that are to be generated for document 18 as well as the desired purpose of document 18 and/or of each chunk 28 of document 18. Topical information 16 can be saved in storage media 22 of system 10 and/or at another location. Topical information 16 can also be derived and/or extracted from another document (as opposed to being entered and/or otherwise provided by a user). In one example, topical information 16 is pulled/extracted from correspondence between a user (e.g., a salesperson/company providing products and/or services) and a client (e.g., a company in need of products and/or services).

Document generation system 10 can include and/or work in conjunction with index 12, which in turn can include and/or function in conjunction with any of the other components of system 10 (such as processor 20, storage media 22, and/or user interface 24). Index 12 can be digital storage that provides a location at which specific data/information, such as one or multiple example chunks 14 can be stored. Index 12 can be located within storage media 22 of system 10, located within another storage/memory, and/or stored at a location distant from system 10. In one example, index 12 is located on a local computer/electronic device (e.g., processor, storage/memory, etc.) of one or multiple users. Index 12 can be accessible by one, multiple, or all users to add to, modify, and/or remove data/information (e.g., example chunks 14). Additionally and/or alternatively, index 12 can be accessible/searchable by search engine 38, first LLM 34, and/or second LLM 46 to retrieve relevant example first chunks 14A, example second chunks 14B, and/or example Nth chunks 14C. Index 12 can have any configurations, functionalities, and/or capabilities to store data/information in any format and to allow access and/or modification by other individuals, components, and/or systems. In one example, index 12 stores example chunks 14 in a JSON format to allow for search engine 38 to quickly and easily use topical information 16 to determine the most relevant example chunks 14.

Document generation system 10 can be configured to generate and/or evaluate document 18 having at least one chunk 28 of text. Document 18 can be any grouping of text and/or numbers able to be generated by system 10. However, in the examples described herein, document 18 is an electronic, textual document having at least one chunk 28 of text as generated dependent upon topical information 16. In one example, document 18 is at least a portion of a contract stating the relationship between two parties. In another example, document 18 is a statement of work that defines the goals and obligations of the involved parties (e.g., the product/service provider and the client). Document 18 can have any number of sections, which are known in the industry as "chunks." In the example shown in FIG. 1, document 18 has first chunk 28A, second chunk 28B, and Nth chunk 28C. Document 18 can have any configuration and/or organization, including one or multiple chunks 28 being separated from one another by headings/section titles. The configuration and/or organization of document 18 can be based upon a template, upon example chunks 14, upon input by a user, upon topical information 16, and/or upon other factors/information. Document 18 can be generated and/or outputted in any format, including in a text format (e.g., Word document), a PDF format, and/or another digital and/or physical format. Additionally, document 18 can be outputted to any location within document generation system 10 and/or external to system 10, such as to a location at which topical information 16 is entered and/or to a user. Document 18 is shown in FIG. 1 as having as many chunks 28 as is necessary/desired, represented as Nth chunk 28C. Each of chunks 28 can have any length, format/configuration, orientation, content, purpose, etc. as is necessary/desired for document 18. For example, each of chunks 28 can have a purpose and/or be focused on a project scope, a project summary, an executive summary, client responsibilities, a project description, deliverables, assumptions, a project duration, a service description, party roles, and/or other purposes and/or focuses. Chunks 28 can form all or a portion of document 18, which document 18 being able to accommodate/include other information not generated by system 10 and/or other information not generated by first LLM 34 but otherwise generated/formulated by system 10.

System 10 (and/or the components of system 10) can include one or multiple computer/data processors 20 (also referred to herein as "processor 20"). In general, processor 20 can include any or more than one of a processor, a microprocessor, a controller, a digital signal processor (DSP), an application specific integrated circuit (ASIC), a field-programmable gate array (FPGA), or other equivalent discrete or integrated logic circuitry. Processor 20 can perform instructions stored within storage media 22 (or located elsewhere), and/or processor 20 can include memory such that processor 20 is able to store instructions and perform the functions described herein. Additionally, processor 20 can perform other computing processes described herein, such as the functions performed by any of the components of system 10.

System 10 (and/or the components of system 10) can also include storage media 22. Storage media 22 is configured to store information and, in some examples, can be described as a computer-readable storage medium, media, and/or memory. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media 22 is a temporary memory. As used herein, a temporary memory refers to a memory having a primary purpose that is not long-term storage. Storage media 22, in some examples, is described as volatile memory. As used herein, a volatile memory refers to a memory that that the memory does not maintain stored contents when power to storage media 22 is turned off. Examples of volatile memories can include random access memories (RAM), dynamic random access memories (DRAM), static random access memories (SRAM), and other forms of volatile memories. In some examples, the storage media/memory is used to store program instructions for execution by the processor. The memory, in one example, is used by software or applications running on system 10 to temporarily store information during program execution.

Storage media 22 can be configured to store larger amounts of information than volatile memory. Storage media 22 can further be configured for long-term storage of information. In some examples, storage media 22 includes non-volatile storage elements. Examples of such non-volatile storage elements can include, for example, magnetic hard discs, optical discs, floppy discs, flash memories, cloud storage media, or forms of electrically programmable memories (EPROM) or electrically erasable and programmable (EEPROM) memories. Additionally, storage media 22 can be digital/electronic storage in the "cloud" that is distant from the other components of project staffing system 10. Storage media 22 can include and/or function in conjunction with data source 38.

System 10 can also include user interface 24. User interface 24 can be an input and/or output device and enables an operator/user to control operation, modification, view of data, index 12, example chunks 14, topical information 16, document 18, chunks 28, and/or the other systems/components within system 10 and/or in communication with system 10. For example, user interface 24 can be configured to receive inputs, such as topical information 16, from a user and/or provide outputs, such as an alert that a chunk 28 includes at least one hallucination. User interface 24 can include one or more of a sound card, a video graphics card, a speaker, a display device (e.g., a liquid crystal display (LCD), a light emitting diode (LED) display, an organic light emitting diode (OLED) display, etc.), a touchscreen, a keyboard, a mouse, a joystick, and/or other type of device for facilitating input and/or output of information in a form understandable to users and/or machines. In one example, a user, operator, and/or other individual can use user interface 24 to view index 12, example chunks 14, topical information 16, queries, requests, document 18, and/or chunks 28.

System 10 can be adjacent to (so as to be contained within one housing, system, etc.) any and/or all of first LLM 34, second LLM 46, and/or search engine 38. Moreover, one component, multiple components, or all of system 10 can be distant from any or all of first LLM 34, second LLM 46, and/or search engine 38. System 10 can communicate with index 12, first LLM 34, second LLM 46, and/or search engine 38 via any type of communication and/or other processes/systems, such as through the use of the internet.

Document generation module 30 of system 10 can include a number of components for formulating document 18 having at least one chunk 28, such as first prompt module 32, first LLM 34, query module 36, search engine 38, and/or assembler module 40. Document generation module 30 can include and/or function in conjunction with any of the other components of system 10 (such as processor 20, storage media 22, and/or user interface 24). Document generation module 30 can be configured to access, receive, and/or otherwise use topical information 16 to generate one or multiple chunks 28 of text for document 18. While document generation module 30 is shown as having a number of components, the components of document generation module 30 can function independently and/or be distinct from document generation module 30. For example, first LLM 34 and search engine 38 may be distinct from document generation module 30 and function in response to requests/queries from document generation module 30 (e.g., from first prompt module 32 and query module 36, respectively).

System 10 can include first prompt module 32, which can include and/or function in conjunction with any of the other components of system 10 (such as processor 20, storage media 22, and/or user interface 24). First prompt module 32 can be configured to create and send requests that include prompts, context, and example chunks 14. All of the information formulated and/or collected by first prompt module 32 (and by second prompt module 44) can be described herein as a "request," which is an inquiry to first LLM 34 or second LLM 46 to perform a task and/or retrieve information. The prompts can each state the desired purpose of the to-be-generated chunks 28. The prompts can each also include instructions and/or tasks for the LLM to perform. The contexts can each provide information that is dependent upon topical information 16. The example chunk(s) 14 are those that were determined by search engine 38 during the search of index 12. First prompt module 32 can formulate, organize, and/or otherwise devise the requests to first LLM 34 such that first LLM 34 performs the desired tasks, returns/retrieves the desired information, etc. in the desired format, configuration, organization, etc. (e.g., first LLM 34 generated one of first chunk 28A, second chunk 28B, and Nth chunk 28C).

The request to first LLM 34 by first prompt module 32 can be a simple request/prompt, which can include only one question/query/inquiry, or can be a complex/compound request/prompt that can include/request a series of separate steps/tasks performed sequentially, concurrently, and/or in another fashion to return desired results. In one example, first prompt module 32 can formulate a request that include multiple (e.g., complex) parts: 1) a prompt states a desired purpose of the to-be-generated chunk 28 as well as other background and useful information; 2) a context that provide information dependent upon topical information 16; and 3) at least one example chunk 14. In this example, the prompt can be a description of what is being requested/asked of the first LLM 34 and can include such items as the format the outputted chunk 28 should be in, the language in which chunk 28 should be in, and/or other information. The request can also include any explanations regarding the provided example chunk(s) 14 as well as any explanations regarding the topical information 16 upon which the to-be-generated chunk 28 is dependent. The information dependent upon topical information 16 as provided in the context of the request (as formulated by first prompt module 32 and/or second prompt module 44) can be any information that is based on, derived from, and/or includes topical information 16 that may be useful to LLMs 34 and/or 46 in generating chunks 28 and/or evaluating chunks 28, respectively. In one example, the information provided in the context dependent upon topical information 16 includes some or all of topical information 16 as accessed, received, and/or otherwise used by system 10, process 100, and/or process 200.

First prompt module 34 can include and/or work in conjunction with storage media 22 to access, receive, and/or otherwise use information from topical information 16 and/or index 12, and can include and/or work in conjunction with processor 20 to perform tasks/instructions to formulate a request. Additionally and/or alternatively, user interface 24 can allow a user to formulate, edit, delete, and/or otherwise modify the request to first LLM 34 to generate one or multiple chunks 28. Further, as described with regards to FIG. 3, first prompt module 34 can include the configuration, functionality, and/or capabilities to determine the order in which multiple chunks 28 should be generated when chunks 28A-28C of document 18 are interdependent upon one another. Second prompt module 44 of document evaluation module 42 can have the same or similar functionalities, configurations, and/or capabilities as first prompt module 32. In one example, first prompt module 32 and second prompt module 44 are the same component that is capable of formulating requests to both first LLM 34 and second LLM 46. Second prompt module 44 is described in greater detail below with regards to document evaluation module 42 and second LLM 46. Before formulating a request to first LLM 34, query module 36 may need to formulate a query to search engine 38, and search engine 38 may need to search index 12 to determine the most relevant example chunk(s)

14 with regards to the to-be-generated chunk 28. This is described in further detail below.

System 10 can include and/or work in conjunction with, receive information from, and/or provide information to first LLM 34 and to second LLM 46. While the example in FIG. 1 shows first LLM 34 and second LLM 46 as being separate and distinct components/systems from one another, first LLM 34 and second LLM 46 can be the same large language model. Additionally, while the example in FIG. 1 shows first LLM 34 and second LLM 46 as being components within (e.g., part of) document generation system 10, first LLM 34 and/or second LLM 46 can be separate and distinct from system 10 (i.e., at a location distant from system 10) and communicate with system 10 via wired or wireless communication.

LLMs 34 and 46 and similar models are increasingly common deep learning algorithms that can recognize, summarize, translate, and/or generate content using large datasets, which can include information available and/or accessed on the internet. LLMs 34 and 46 can be used to process simple or complex requests which, for example, demand retrieval of data from multiple or specialized sources, assemble outputs (e.g., natural language, computer code, lists) from the retrieved data based on identified criteria, and/or further process of those outputs (e.g., transmission or archival to specified categories or locations and/or recipients). LLMs 34 and 46 can include generalized LLMs, specialized LLMs, and/or other models. LLM 14 can be a model and/or other system known to one of skill in the industry for retrieving, organizing, summarizing, manipulating, and/or performing other functions with regards to information in response to one or multiple requests from first prompt module 32 and/or second prompt module 44. LLMs 34 and 46 can be configured to communicate with (e.g., provide information to and receive information from) any of the components of system 10 and/or other components, such as index 12, document generation module 30, document evaluation module 42, search engine 38, assembler module 40, and/or the internet. The specific use of first LLM 34 and second LLM 46 with system 10 is described in detail below with regards to, for example, process 100 and/or process 200.

The information/results determined by first LLM 34 and/or second LLM 46 can be communicated/provided to any of the components of system 10 and/or other components/systems distinct from system 10 (e.g., chunks 28 and/or the full document 18 can be communicated/provided to a user at a location distant from system 10, such as the user's email inbox, a computer terminal, etc.). Chunks 28 can be communicated/provided in real time as each chunk 28 is generated. In another example, system 10 can wait to provide chunks 28 until all chunks 28 are generated and assembled/compiled into one complete document 18 (e.g., compiled by assembler module 40 as described below).

First prompt module 32 and/or other components of document generation system 10 can receive and/or work in conjunction with query module 36 and/or search engine 38. Query module 36 can include and/or work in conjunction with storage media 22 to access, receive, and/or otherwise use information based on topical information 16 and/or other information, and can include and/or work in conjunction with processor 20 to perform tasks/instructions to formulate a query/request. Additionally and/or alternatively, user interface 24 can allow a user to formulate, edit, delete, and/or otherwise modify the query/request to search engine 38 to determine one or more example chunks 14. Query module 36 can be configured to formulate a query to search engine 38 asking search engine 38 to examine/search index 12 and determine at least one (but potentially more) relevant example chunks 14. The example chunks 14 are dependent upon topical information 16 and potentially upon the desired purpose of the to-be-generated chunk 28A-28C. In the example shown in FIG. 1, example first chunks 14A correspond to (e.g., are the results of a search depending upon topical information 16 and the desired purpose of) the to-be-generated first chunk 28A, example second chunks 14B correspond to the to-be-generated second chunk 28B, and example third chunks correspond to the to-be-generated third chunk 28C.

Query module 36 can access, receive, and/or otherwise use topical information 16 and/or other information, such as a desired purpose of the to-be-generated chunk 28. Query module 36 can then formulate a query/request to search engine 38 based on that information. The query can convert the information contained in the query/request into any format suitable for use by search engine 38 in determining relevant example chunks 14. In one example, the information is converted into one or multiple vector embeddings that are more easily used as inputs to search engine 38. Vector embeddings can be a way to convert words, sentences/phrases, and/or other information/data into numbers that capture relationships. Thus, search engine 38 can use the vector embeddings provided by query module 36 to find similarities between the information in the query/request and example chunks 14 in index 12. The formulation of queries/request by query module 36 can be performed automatically and/or concurrently with respect to multiple to-be-generated chunks 28 (e.g., multiple queries can be formulated concurrently for each to-be-generated chunk 28 to ask search engine 38 to determine example chunks 14 corresponding to the to-be-generated chunks 28). The automatic formulation of a query/request by query module 36 can be performed in response to the reception of topical information 16 and/or the determination/selection of the type of document 18 to be generated (and thus the determination/selection of how many, which kind, and purposes of chunks 28).

Further, system 10 can work in conjunction with, receive information from, and/or provide information to search engine 38. Search engine 38 can be any software system(s) that identifies results/information in databases/datasets (such as index 12) in response to one or multiple queries/requests. Search engine 38 can be configured to perform any type of search, such as a similarity search, to determine relevant example chunk(s) 14 dependent upon topical information 16. For example, a similarity search can use cosine similarity and/or be a vector search. The databases/datasets can be, for example, available and/or accessed on the internet. Additionally, as described below, search engine 38 can include and/or have access to index 12, which may include multiple example chunks 14 and/or other information useful to the generation of chunks 28. For example, prior documents 18 can be included in index 12. Search engine 38 can be configured to provide search results (e.g., data, information) as prompted by any type of query, such as a navigational, informational, transaction, and/or investigational query. Additionally, the query can be in the form of a semantic and/or similarity search. Search engine 38 can be any system, model, and/or process known to one of skill in the industry for providing results/information in response to one or multiple queries/requests. Search engine 38 can be configured to communicate with (e.g., provide information to and receive information from) any components of system 10, including first prompt module 32, first LLM 34, second prompt module 44, second LLM 46, and/or other components of system 10 and/or distinct from system 10.

System 10 can include assembler module 40, which can include, communicate with, and/or function in conjunction with any of the other components of system 10 (such as processor 20, storage media 22, and/or user interface 24). Assembler module 40 can be configured to access, receive, and/or otherwise use newly generated chunk(s) 28 to assemble/compile multiple chunk(s) 28 into one continuous document 18. Assembler module 40 can use a template and/or other information to determine how and in which order to assemble/compile the multiple chunks 28 into one document 18 that is organized, coherent, easy to understand, and consistent with other documents of similar type (e.g., if document 18 is a SOW, then assembler module 40 can assemble and/or organize chunks 28 in a manner that is consistent with other SOWs). Assembler module 40 can receive chunks 28 from first LLM 34 after each chunk 28 is generated, and assembler module 40 can store the chunks 28 at any location, including in storage media 22, until all chunks 28 have been generated. Additionally and/or alternatively, assembler module 40 can function in conjunction with user interface 24 to allow a user to formulate, edit, delete, and/or otherwise modify the configuration, organization, etc. of chunks 28 and/or document 18. Assembler module 40 can perform other alternations and/or inclusions to document 18, such as providing headings and/or other information within document 18 to improve readability and/or understanding.

System 10 can also include, work in conjunction with, and/or otherwise use and/or communicate with document evaluation module 42. Document evaluation module 42 can include second prompt module 44 and/or second LLM 46 configured to evaluate one or each chunk 28 as generated by first LLM 34 for one or multiple hallucinations. Those of skill in the industry are aware that information generated by a large language model can include hallucinations that are data/information that is not factually correct and/or that is not responsive and/or relevant to the request/query/prompt. Inclusion of these hallucinations in chunks 28 and/or document 18 can be problematic, so document evaluation module 42 is configured to identify hallucinations in chunks 28 and/or document 18.

Document evaluation module 42 can include second prompt module 44, which can include and/or function in conjunction with any of the other components of system 10 (such as processor 20, storage media 22, and/or user interface 24). Second prompt module 44 can have the same or similar configurations, capabilities, and/or functionalities as first prompt module 32 described above. Additionally, first prompt module 32 and second prompt module 44 can be the same module such that one component/module has all of the capabilities and performs all of the tasks described herein with regards to first prompt module 32 and second prompt module 44. However, second prompt module 44 is configured to formulate and send requests that include prompts (that ask second LLM 46 to review the newly generated chunks 28 for hallucinations) and contexts (that provides the generated chunk(s) 28 and topical information 16). Each request can be in regards to one newly generated chunk 28, or each request can include multiple chunks 28 and the request can ask second LLM 46 to evaluate all provided chunks 28 for hallucinations. The request to second LLM 46 as formulated and/or communicated by second prompt module 44 can have any format, can include any number of requests/prompts (e.g., simple and/or complex), and can include other information not expressly described above.

Because the request to second LLM 46 can include one or multiple chunks 28 as generated by first LLM 34, second prompt module 44 can be in communication with first LLM 34 and/or other components of system 10 to access, receive, and/or otherwise use newly chunks 28 and/or document 18.

As described above, system 10 can include (and second prompt module 44 can be in communication with) second LLM 46. Second LLM 46 can have the same or similar configurations, capabilities, and/or functionalities as first LLM 34 described above. In one example, first LLM 34 and second LLM 46 are the same large language model. In another example, second LLM 46 is trained and/or fine-tuned for the evaluation of chunks 28 for hallucinations, thereby potentially being specialized for evaluations as compared to first LLM 34. Thus, in some configurations, it may be advantageous for second LLM 46 to be a separate and distinct large language model from first LLM 34 because the evaluation by second LLM 46 of chunks 28 for hallucinations as generated by first LLM 34 may be more accurate than the evaluation by first LLM 34. The evaluation by second LLM 46 may be performed individually on each chunk 28 after each chunk 28 is generated by first LLM 46, and thus before that chunk 28 is used in generating subsequent chunks 28 that are dependent upon that newly generated chunk 28. Alternatively, the evaluation can be performed after all chunks 28 in document 18 have been generated by first LLM 34. In one example, the generation of chunks 28 and the evaluation of those chunks 28 are performed concurrently (e.g., first chunk 28A is evaluated by second LLM 46 for hallucinations while second chunk 28B is being generated by first LLM 34). In another example, the evaluation of chunks 28 for hallucinations can be performed by first LLM 34, and first LLM 34 may include additional training and/or fine-tuning to better evaluate chunks 28 for hallucinations. Further, the evaluation by first LLM 34 and/or second LLM 46 for hallucinations may be improved by refining the prompt provided to first LLM 34 and/or second LLM 46 asking the LLM to evaluate the chunk(s) 28 for hallucinations.

System 10, and particularly document evaluation module 42 (including second prompt module 44 and/or second LLM 46) can be configured to perform various actions in response to second LLM 46 determining that one or multiple chunks 28 include one or multiple hallucinations. In one example, system 10 can discard/delete the chunk 28 that is determined to include one or multiple hallucinations. In another example, system 10 can save the chunk 28 that is determined to include one or multiple hallucinations. The saved chunk 28 may be used for training and/or fine-tuning of first LLM 34 and/or second LLM 46, further evaluation, and/or other purposes, for example. In a third example, system 10 can initiate an alert stating/exclaiming that chunk 28 includes at least one hallucination. The alert, for example, can be a visual and/or audio alarm that notifies a user that a hallucination was found, such as via user interface 24. System 10 can include other configurations, capabilities, and/or functionalities not expressly disclosed herein. The process for generating chunks 28, assembling those chunks 28 into one continuous document 18, and evaluating those chunks 28 and/or the document 18 for hallucinations is described in process 100 shown in FIG. 2.

FIG. 2 is a method flow chart describing an example process 100 for generating document 18 having multiple chunks 28 of text and/or evaluating those chunks 28 for hallucinations.

While process 100 is described herein as being used with regards to document generation system 10, process 100 can be performed by any system having any components, capabilities, configurations, and/or functionalities suitable for performing process 100. Additionally, process 100 can include other steps not expressly disclosed herein and/or can include performing the disclosed steps in any order and/or multiple times as is desired and/or necessary to generate one or multiple chunks 28 of text for document 18 and/or evaluate those chunks 28 of text for hallucinations. Moreover, not all steps of process 100 must be performed, and process 100 can be performed partially and/or entirely in a digital environment by and/or within the systems/components set out in FIG. 1, such as document generation system 10 and/or other systems/components.

Process 100 can include step 102, which is to access, receive, and/or otherwise collect/use topical information 16. Step 102 can include providing topical information 16 to system 10 by various means, and/or by entering topical information 16 by a user via user interface 24. In one example, step 102 includes entering topical information 16 via a website on the internet and/or on a software program, which then automatically provides topical information 16 to system 10. In another example, step 102 includes a user entering topical information 16 in a dialog box provided by user interface 24 of system 10. Step 102 can include saving topical information 16, such as by saving topical information 16 in storage media 22. As described above, topical information 16 as collected in step 102 can include a project name, a project identification number, a client name, a client industry, a client description, a document type, project challenges, a project duration, project priorities, project special considerations, project service type(s), a delivery type, a delivery location, the name/type of to-be-generated chunks 28, the number of chunks 28 to be generated, the purpose and/or desired content of document 18 and/or chunks 28, and/or other information. Step 102 can include extracting and/or otherwise deriving topical information 16 from another document (i.e., collecting topical information 16 from another document (as opposed to being entered and/or otherwise provided by a user). In one example, step 102 includes pulling/extracting topical information 16 from correspondence between a user (e.g., a salesperson/company providing products and/or services) and a client (e.g., a company in need of products and/or services).

Process 100 can include step 104, which is determining the chunk 28 of text to generate. If chunks 28A-28C are interdependent upon one another, than step 104 can include further sub-steps as described with regards to process 200 shown in FIG. 3. Step 104 can be performed by one or multiple components of system 10 and/or by computer processor 20. Step 104 can be performed by referring to a template, document, list, instructions, tables, graphs, and/or other information that details the order in which chunks 28 should be generated. This information can be dependent upon topical information 16 and/or the type of document 18 to be generated. Further, step 104 can include determining the chunk 28 to generate by reviewing example chunks 28 and/or example documents 18, by using a template of document 18, by using information specifying the order in topical information 16, by using machine learning and/or any other type of algorithms and/or artificial intelligence, and/or by various other methods and/or tools. In one example, step 104 determines the chunk 28 of text to generate first by referring to a configuration file that sets out the order in which chunks 28 should be generated for that particular type of document 18. In this example, document 18 can be a SOW and the configuration file can set out the order to generate chunks 28A-28C as follows: generate chunk 28A with a desired purpose of project scope, then generate chunk 28B for project duration, and then generate chunks 28C thereafter for assumptions, client responsibilities, deliverables, service description, and party roles. Step 104 can be performed once before generating multiple chunks 28, or step 104 can be performed before each chunk 28 is generated, even if multiple chunks 28 are being generated for one document 18.

Step 106 can include formulating a query to search engine 38. Step 106 can include using topical information 16 (and potentially other information, such as a desired purpose of the to-be-generated chunk 28 and/or document 18) to formulate a query to search engine 38 instructing search engine 38 to search/examine index 12 for example chunk(s) 14 relevant to topical information 16 and the to-be-generated chunk 28. Step 106 can be performed by query module 36 and/or by any component of system 10. Additionally and/or alternatively, step 106 can include allowing a user, via user interface 24, to formulate, edit, delete, and/or otherwise modify the query to search engine 38 to determine one or more relevant example chunks 14. Step 106 can be performed automatically in response to the collection of topical information 16 and/or instructions for system 10 to generate chunk(s) 28, and/or step 106 can be performed as initiated by a user. In one example, a user initiates system 10 to begin process 100 and one, multiple, or all steps of process 100 are performed automatically concurrently and/or in series in response. The query can be any type, such as a navigational, informational, transaction, and/or investigational query. Step 106 can include converting the information contained in the query into any format suitable for use by search engine 38 in determining relevant example chunks 14. For example, step 106 can include converting the information into one or multiple vector embeddings that are used as inputs to search engine 38 to find similarities between the information in the query and example chunk(s) 14 in index 12. As with step 104 above, step 106 can be performed automatically and/or concurrently with respect to multiple chunks 28 (e.g., multiple queries can be formulated concurrently for each chunk 28 that is to be generated to instruct search engine 38 to determine relevant example chunks 14 corresponding to each of the to-be-generated chunks 28).

Process 100 can then include step 108, which is to search index 12 by search engine 38 for at least one relevant example chunk 14, and step 110, which is to determine/select the at least one example chunk 14. Steps 108 and 110 can be initiated by query module 32 and/or other components providing a query to search engine 38. Steps 108 and/or 110 can be performed by search engine 38 and/or by any software system(s), models, and/or processes known to one of skill in the industry that search and identify results/information (e.g., relevant example chunks 14) in index 12, extracts the relevant example chunks 14, and/or sends those relevant example chunks 14 to the proper components of system 10 (and/or saves those relevant example chunks 14). Step 108 can include any type of search, such as a similarity search that uses cosine similarity and/or vector searching. In one example, step 108 includes using vector embeddings to search index 12 containing example chunks 14, and step 110 includes determining/selecting the most relevant example chunks 14 having the greatest similarity with respect to the vector embeddings in the query. In another example, step 110 uses information provided in step 106 (e.g., the information in the query/request that is dependent upon topical information 16 and/or the type of chunk that is to be generated) to compare the information to example chunks 14 to determine one or multiple relevant example chunks 14.

Steps 110 can include determining/selecting the single most relevant example chunk 14, or step 110 can include determining/selecting multiple relevant example chunks 14 (e.g., selecting the top three example chunks 14). Step 110 can also include saving and/or otherwise communicating the determined/selected example chunk(s) 14 to any component of system 10, such as first prompt module 32 and/or first LLM 34.

Concurrent with and/or after the previous steps have determined/selected example chunk(s) 14, step 112 can be performed by formulating the request to first LLM 34 by first prompt module 32 and/or by other components of system 10. Along with step 112, process 100 can have step 114, which is to assemble the request (i.e., the information included in the request) that includes the prompt that can state the desired purpose of the to-be-generated chunk 28, the context that provides information dependent upon topical information 16, and the at least one example chunk 14. Step 112 can include formulating/determining the contents of the request as well as organizing and/or otherwise devising the request to first LLM 34 so that first LLM 34 performs the desired tasks, returns/retrieves the desired information, etc. in the desired format, configuration, organization, etc. (e.g., first LLM 34 generates one of first chunk 28A, second chunk 28B, and Nth chunk 28C). As described above with regards to first prompt module 34 and second prompt module 44, the request as formulated in step 112 and assembled in step 114 can be a simple request or a complex/compound request that can include/require a series of separate steps/tasks performed sequentially, concurrently, and/or in another fashion to return desired results (e.g., to return chunk 28 accomplishing the desired purpose). The request as formulated in step 112 can include other information, such as any explanations regarding the provided example chunk(s) 14 as well as any explanations regarding the information dependent upon topical information 16.

Step 112 and/or step 114 can be performed by and/or in conjunction with storage media 22 to access, receive, and/or otherwise use information dependent upon topical information 16, index 12 (e.g., example chunks 14), and/or other information saved in storage media 22. Additionally, the request as assembled in step 114 can be saved in storage media 22 before step 116 (providing the request to first LLM 34). Steps 112 and 114 can be similar to step 132 of sub-process 130, except for the content of the request formulated in step 134 may be different than the content of the request formulated and assembled in steps 112 and 114, respectively. The formulation of the prompt in step 112 having the desired purpose of the to-be-generated chunk 28 can be performed automatically dependent upon the topical information 16, the type of chunk 28 to be generated (as determined by step 104), and/or other information (such as template information of document 18). For example, step 104 can determine that chunk 28 to be generated is to be the project scope. Step 112 can include automatically formulated the prompt that has the desired purpose of chunk 28 (e.g., drafting text regarding the project scope and text stating specifically what the project scope will include/entail based on topical information 16). In other examples, the to-be-generated chunk 28 can have a different desired purpose dependent upon the same or different portions of topical information 16. The assembly of the request in step 114 can be such that all information in the request is compiled into a single body of text that is provided to first LLM 34 simultaneously (i.e., at one time), or the request can be assembled in multiple sections (e.g., divided into the prompt, context, and example chunks 14) and provided to first LLM 34 in step 116 in portions (as opposed to the entirety of the request being provided at one time).

Process 100 can include step 116, which is providing the request that includes the prompt, the context, and the example chunks 14 to first LLM 34. As described above, the request can be provided to first LLM 34 at one time, or sections/portions of the request can be provided to first LLM 34 separately (e.g., the prompt, context, and example chunks 14 can be provided to first LLM 34 at different times/instances). Step 116 can be performed by any component of system 10, including by first prompt module 32. With first LLM 34 able to be integrated/part of system 10 or distant from system 10, providing the request to first LLM 34 in step 116 can be performed via wired and/or wireless communication. Providing the request to first LLM 34 can be performed by entering the request into a dialog and/or text box associated with first LLM 34 and/or by other methods. Step 112 (formulating request), step 114 (assembling request), and step 116 (providing request to first LLM 34) may collectively be described and/or referred to as "prompting" first LLM 34 to generate the chunk 28.

After first LLM 34 accesses, receives, and/or otherwise uses the request that includes the prompt, the context, and the example chunk(s) 14, process 100 can include step 118. Step 118 can include generating chunk 28 of text dependent upon topical information 16 and, potentially, among other information. Step 118 can be performed via various methods and/or with aid from, for example, the internet and/or other sources. Step 118 can include generating chunk 28 that includes one or multiple textual sentences, paragraphs, etc. that accomplish the desired purpose as set out in the prompt of the request. Additionally, while chunk 28 is described herein as being a chunk of text, chunk 28 as generated in step 118 can include other information, such as algorithms, numbers, software code, graphs, tables, etc. having any arrangement, configuration, and/or orientation useful to a user and/or software program. Once generated, step 118 can include communicating and/or otherwise allowing access to the newly generated chunk 28 by the other components of system 10. In one example, the newly generated chunk 28 is communicated from first LLM 34 to storage media 22 and/or assembler module 40. Additionally, step 118 can include formulating, modifying, deleting all or portion of, and/or otherwise altering the newly generated chunk 28 depending on the desired and/or actual purpose of chunk 28, topical information 16, and/or other factors. Such alternations can be performed during step 118 (e.g., after each chunk 28 is generated) and/or after all generated chunks 18 are assembled to form documents 18.

After each chunk 28 is generated in step 118, process 100 can include step 120, which is to repeat one, multiple, and/or all of steps 102 through 118 until all chunks 28 of document 18 are generated. As described above, one, multiple, or all of steps 102 through 118 can be performed each time a new chunk 28 is to be generated. In one example, steps 102 and 104 are performed only once at the beginning of process 100 and steps 106 through 118 are performed each time a new chunk 28 is to be generated. The repeating of one, multiple, or all of steps 102 through 118 as set out in step 120 can be performed automatically dependent upon the number and/or types of chunks 28 to be generated. For example, the repeating of steps in process 100 to generate additional chunk(s) 28 can be initiated automatically upon completing the generation of a chunk 28 and/or when a newly chunk 28 is received from first LLM 34. In another configuration, step

120 (i.e., the repeating of the steps to generate another chunk 28) can be initiated by a user and/or by other means after a new chunk 28 is generated.

After one or all chunks 28 have been generated via process 100, process 100 can further include step 122, which is assembling the multiple newly generated chunks 28 into one all-encompassing document 18. Step 122 can be performed by any component(s) of system 10 (and/or by other capable systems), such as assembler module 40. In other configurations of process 100, step 122 does not need to be performed. Instead, each newly generated chunk 28 (or if only one chunk 28 is generated by process 100) can be communicated individually to a user or to another location after the performance of step 118. Step 122 can include the use of a template and/or other information to determine how and in which order to assemble/compile the chunks 28 into one document 18 that is organized, coherent, easy to understand, and consistent with other documents of similar type. Additionally, step 122 can include formulating, modifying, deleting, and/or otherwise altering all or portions of chunks 28 and/or other information in document 18. In one example, step 122 can include adding headings and/or other information before, within, and/or after one or multiple chunks 28.

Process 100 can also include step 124, which is communicating one or multiple chunks 28 and/or a portion or all of document 18 to a user and/or to another endpoint, such as a computer terminal, email address, storage media 22, another storage media distinct from system 10, and/or another location within or distant from system 10. Step 124 can be performed by various communication methods, such as via wired and/or wireless communication. Additionally, step 124 can be performed automatically after each chunk 28 is generated and/or after document 18 is assembled, or step 124 can be performed manually as initiated by a user and/or by another input.

Process 100 can also include sub-process 130, which is an evaluation of one, multiple, or all newly generated chunk(s) 28 for at least one hallucination as generated by first LLM 34 and/or via another method/system. Sub-process 130 can be performed any time after the generation of a chunk, such as after step 118 (e.g., after each time step 118 is performed to generate a new chunk 28), after step 122 (i.e., after chunks 28 have been assembled in document 18), and/or at other times. Sub-process 130, like process 100, can be performed by any system having any components, capabilities, configurations, and/or functionalities suitable for performing sub-process 130. Additionally, process 100 can include configurations in which sub-process 130 is not performed, and sub-process 130 may be performed without performing one, multiple, or all of the other steps of process 100. Moreover, not all steps of sub-process 130 must be performed, and sub-process 130 can be performed partially and/or entirely in a digital environment by and/or within the systems/components set out in FIG. 1, such as document generation system 10 having document evaluation module 42.

Sub-process 130 can include step 132, which includes formulating a request to second LLM 46 by second prompt module 44 and/or by other components of system 10 (such as first prompt module 34 as described above). Step 132 can include assembling the request (similar to step 114 with regards to the generation of chunks 28). Step 132 can include the same and/or similar processes, capabilities, and/or configurations as steps 112 and 114, except that step 132 is focused on formulating a request instructing second LLM 46 to review/evaluate the chunk 28 for one or multiple hallucinations. The request formulated in step 132 can include a prompt that instructs second LLM 46 to review chunk 28 for one or multiple hallucinations and a context that provides the newly generated chunk 28, topical information 16, and/or information dependent upon topical information 16 to second LLM 46. Step 132 can include formulating/determining the contents of the request as well as organizing and/or otherwise devising the request to second LLM 46 so that second LLM 46 performs the desired tasks, returns/retrieves the desired information, etc. in the desired format, configuration, organization, etc. (e.g., second LLM 46 review chunks 28 for hallucinations). As described above with regards to first prompt module 32 and second prompt module 44, the request as formulated and assembled in step 132 can be a simple request or a complex/compound request that can include/require a series of separate steps/tasks performed sequentially, concurrently, and/or in another fashion to return desired results (e.g., to return a determination of whether the provided chunk(s) 28 include at least one hallucination). The request as formulated in step 132 can include other information, such as the desired purpose of chunk 28, any explanations regarding the provided chunk(s) 28, as well as any explanations regarding topical information 16 and/or the information dependent upon topical information 16.

Step 132 can be performed by and/or in conjunction with storage media 22 to access, receive, and/or otherwise use topical information 16 and/or information dependent upon topical information 16, newly generated chunk(s) 28, and/or other information saved in storage media 22. Additionally, the request as assembled in step 132 can be saved in storage media 22 before step 134 (i.e. before providing the request to second LLM 34). The formulation of the prompt in step 132 instructing second LLM 46 to determine whether chunk (s) 28 have any hallucinations can be performed automatically after one, multiple, or all chunks 28 are generated and/or based upon other information/factors. Step 132 can include automatically formulating the prompt that has the instructions to evaluate chunk 28 for hallucinations as well as automatically accessing, receiving, and/or otherwise using chunk 28 and topical information 16 (and/or information dependent upon topical information 16). In one example, the prompt includes a textual description asking second LLM 46 to review the provided chunk 28 for hallucinations. In another example, the prompt includes other information, such as explanations regarding the chunk 28 and/or topical information 16 (and/or information dependent upon topical information 16). The assembly of the request in step 132 can be such that all information in the request is compiled into a single body of text and/or other information that is provided to second LLM 46 in step 134 simultaneously (i.e., at one time), or the request can be assembled in multiple sections (e.g., the prompt and the context) and provided to second LLM 46 in step 134 in portions (as opposed to the entirety of the request being provided at one time). In another configuration, step 132 can be performed by first prompt module 32 such that all requests are formulated by one component/processor.

Sub-process 130 can further includes step 134, which can be providing the request having the prompt and the context to second LLM 46. Step 134 of sub-process 130 can be similar to step 116, except that the request as formulated by second prompt module 44 is provided to second LLM 46. In another configuration, step 134 includes providing the request instead to first LLM 34, and first LLM 34 is instructed to review the chunk(s) 28 for hallucinations. As described above, the request can be provided to second LLM

46 at one time, or in sections/portions of the request can be provided to second LLM 46 separated (e.g., the prompt and the context can be provided at different times/instances). Step 134 can be performed by any component of system 10 and/or with the aid of any component, including second prompt module 44. With second LLM 46 being within system 10 or distant from system 10, providing the request to second LLM 46 in step 134 can be performed via wired and/or wireless communication. Providing the request to second LLM 46 can be performed by entering the request into a dialog and/or text box associated with second LLM 46 and/or by other methods.

After second LLM 46 accesses, receives, and/or otherwise uses the request that includes the prompt and context, sub-process 130 can include step 136. Step 136 can include determining whether newly generated chunk(s) 28 include at least one hallucination. Step 136 can be performed via various methods and/or with aid from, for example, the internet and/or other sources. Step 136 can include outputting a conclusion as to the determination of whether the provided, newly generated chunk(s) include a hallucination in a variety of formats, including a yes/no answer, a value, table, graph, etc. representing the likelihood that each provided chunk 28 includes a hallucination (e.g., a probability that a hallucination is present), an annotated/highlighted recitation of the chunk(s) 28 noting which portions are determined to be hallucinations, and/or other information. The output can have any arrangement, configuration, and/or orientation useful to a user and/or software program. Once the evaluation is complete, step 136 can include communicating and/or otherwise allowing access to the determination (e.g., the conclusion of the evaluation) by the other components of system 10. In one example, the determination is communicated to storage media 22, a component that can initiate an alert, a user, a computer software program, and/or another location.

Sub-process 130 can include a number of optional steps 138, 140, and 142 that can be performed if step 136 determines that chunk 28 includes at least one hallucination and/or if step 136 determines that there is a high probability (e.g., a probability above a specific threshold) that chunk 28 includes at least one hallucination. If step 136 returns a determination that no hallucination exists in chunk 28 and/or if step 136 does not return a determination (e.g., the determination is inconclusive), steps 138, 140, and/or 142 may not be performed.

Step 138 can include, if a hallucination is determined, discarding/deleting the newly generated chunk 28 and potentially repeating some or all of the steps of process 100 to generate a new chunk 28 with the same desired purpose. Step 138 can be performed by any component of system 10, and the discarding of chunk 28 can be the temporary or permanent deletion of chunk 28 via electronic/digital and/or other means. Step 138 can be performed manually by a user in response to a determination that chunk 28 includes a hallucination, and/or step 138 can be performed automatically in response to the determination and/or in response to other events. If no hallucination is found, step 138 may not be performed and chunk 28 can be communicated to a user and/or be assembled into document 18 (e.g., step 144 can be performed).

Step 140 can include, if a hallucination is determined, saving the newly generated chunk for further analysis, training, etc. Step 140 can be performed by any of the components of system 10, including by storage media 22. The saving of chunk 28 in step 140 can be performed automatically in response to the determination and/or in response to other events. If no hallucination is found, step 140 may not be performed and chunk 28 can be communicated to a user and/or be assembled into document 18 (e.g., step 144 can be performed).

Step 142 can include, if a hallucination is determined, initiating an alert that notifies a user of such determination. Step 142 can be performed by any of the components of system 10 and/or by a component that is not expressly disclosed herein. The initiating of the alert and the alert itself can include sending a textual notification to a user, providing and audio and/or visual alert/notice, and/or any other type of alert to draw attention to the determination in step 138 that chunk 28 includes at least one hallucination and/or that chunk 28 has a high probably of including a hallucination (if the determination includes merely a value representative of a probably that a hallucination is present in chunk 28, and that value is above a threshold to set off step 142). As with steps 138 and 140, step 142 can be performed manually and/or automatically in response to a determination that chunk 28 includes a hallucination, and if no hallucination is found, step 142 may not be performed and instead step 144 may be performed. In one example, the initiating of the alert and/or the alert is performed via user interface 24.

Step 144 can include keeping newly generated chunk 28 and continuing with process 100 if no hallucination is determined, if the determination is inconclusive, and/or if the determination reveals a low probability that chunk 28 includes a hallucination. Thus, if step 144 is performed, process 100 can continue by assembling the evaluated chunk 28 (with other chunks 28 that were evaluated and determined to be hallucination-free) into document 18 and/or providing and/or otherwise communicating chunk 28 to a user and/or to another location.

Process 100 can include other steps not expressly disclosed herein and/or not shown in FIG. 2. For example, process 100 can include a step that includes training first LLM 34, second LLM 46, and/or search engine 38. The training of these elements/components can be by using previous requests as formulated by first prompt module 32 and/or second prompt module 44, queries as formulated by query module 36, example chunks 14 as found in index 12, and/or chunks 28 that were previously generated in prior performances of process 100. The training of machine-learning models, search engines, large language models, etc. is known to one of skill in the industry. Other configurations of process 100 can include not performing training, performing the training before the performance of the other steps in process 100, and/or performing the training only once while the other steps of process 100 are performed multiple times to generate different chunks 28, evaluate different chunks 28, etc. Additionally, the training can be performed periodically as new training data/information is formulated and/or can be performed dependent upon the accuracy/efficiency of first LLM 34, second LLM 46, and/or search engine 38 (e.g., when the results are less than desired, the training can be initiated at any time).

FIG. 3 is a method flow chart describing example process 200 for determining an order/sequence to generate multiple chunks 28 of text interdependent upon one another. As with process 100 (and sub-process 130), process 200 can be performed by any system having any components, capabilities, configurations, and/or functionalities suitable for performing process 200, including document generation system 10. Additionally, process 200 can include other steps not expressly disclosed herein and/or can include performing the disclosed steps in any order and/or multiple times as is desired and/or necessary to generate one or multiple chunks

28 of text that are interdependent upon one another. Moreover, not all steps of process 200 must be performed, and process 200 can be performed partially and/or entirely in a digital environment by and/or within the systems/components set out in FIG. 1, such as document generation system 10 and/or other systems/components. In some example configurations, one, multiple, or all of the steps of process 200 can be integrated into process 100 such that the steps of process 200 can be performed concurrently and/or in series with one, multiple, or all of the steps of process 100. For example, process 200 can include collecting topical information 16 (step 102) at the beginning of process 200. In another example, process 200 can include sub-process 130 performed once or multiple times throughout process 200, such as after each chunk 28 is generated. In a third example, process 200 can include assembling multiple chunks 28 into document 18 (step 122) and/or communicating those chunk (s) 28 and/or document 18 to a user and/or another location (step 124).

Process 200 can include step 202, which is determining a first level chunk 28 of text to generate. The first level chunks 28 are those chunks of text that do not depend upon any other to-be-generated chunks 28 and instead depend upon topical information 16, at least one example chunk 14, the desired purpose of chunk 28 as set out in the context of the request to first LLM 34, and/or other information. In one example, a first level chunk 28 has a desired purpose that is the scope of the project. In this example, the scope of the project does not depend from other to-be-generated chunks 28 having other desired purposes. Determining which chunks 28 are first level chunks 28 can be performed by referring to a template, document, instructions, tables, graphs, and/or other information that state/show which chunks 28 are not dependent from other to-be-generated chunks (e.g., are independent from other chunks). This information can be formulated before the beginning of process 200 and/or during process 200, and the information can be generated automatically by system 10 by reviewing example and/or template documents 18 that are of a similar type to the document 18 to be generated by process 200. In another configuration, this information (e.g., the order in which chunks 28 are generated/the level that each chunk 28 is in and the dependencies of chunks 28) can be formulated by a user. The information can be saved at any location, including in storage media 22 and can be referenced and/or used by system 10 to perform step 202.

After determining the first level chunk 28 to generate, process 200 can include step 204, which is to formulate a query (by, for example, query module 36), search index 12 (by, for example, search engine 38), and determine/retrieve at least one relevant example chunk 14 (by, for example, search engine 38). Step 204 is similar to steps 106, 108, and 110 as described in process 100 shown in FIG. 2. Review this description with regards to steps 106, 108, and 110 for further details of the functionalities, capabilities, configurations, and/or other information of step 204.

After determining at least one relevant example chunk 14, process 200 can include step 206, which is to formulate a request (by, for example, first prompt module 32), assemble the request (by, for example, first prompt module 32), provide the request to first LLM 34, and generate first level chunk 28 (by, for example, first LLM 34). Step 206 is similar to steps 112, 114, 116, and 118 as described in process 100 shown in FIG. 2. Review this description with regards to steps 112, 114, 116, and 118 for further details of the functionalities, capabilities, configurations, and/or other information of step 206.

Next, process 200 can include step 208, which is to repeat the above steps 202-206 to generate all first level chunks 28. Step 208 can be repeated as many times as is necessary to generate all of the first level chunks 28 that do not depend upon any other generated and/or to-be-generated chunks 28. For example, if document 18 is to includes eight chunks 28 that do not depend from other to-be-generated chunks 28, then step 208 (repeating the generation of one first level chunk) is performed seven times, for a total generation of eight first level chunks 28. For each time step 208 is performed, relevant example chunk(s) 14 can be determined/retrieved from index 12 depending on topical information 16, the desired purpose of the particular to-be-generated chunk 28, and/or other information relevant to the particular to-be-generated chunk 28.

After one, multiple, or all first level chunks 28 have been generated via steps 202-208, process 200 can includes step 210. Step 210 is determining a second level chunk 28 of text to generate. Step 210 can be performed after all first level chunks 28 upon which the to-be-generated second level chunk 28 depends are already generated. Thus, process 200 can include performing step 210 before every first level chunk 28 is generated (e.g., the steps of process 200 do not need to be performed in the order shown in FIG. 3 and described herein, and step 210 can be performed before step 208). Step 210 can be performed after the one or multiple first level chunks 28 that the second level chunk 28 depends from have been generated. Step 210 can be performed similarly to step 202, except that second level chunks 28 depend from newly generated first level chunks 28 as opposed to depending only from topical information 16, the example chunks 28, and/or the desired purpose of the to-be-generated chunk 28. For example, first level chunk 28, which has already been generated by process 200, can be focused on the scope of the project. Second level chunk 28 can be focused on the project assumptions, which depends upon (e.g., includes information from and/or information that is derived from) the scope of the project. The determination of which chunks 28 are second level chunks can be performed similarly to that in step 202, such as by referring to a template, document, instructions, tables, graphs, and/or other information that state/show which chunks 28 are dependent from first level chunks. This information can be formulated before the beginning of process 200 and/or during process 200, and can be formulated automatically and/or manually.

A second level chunk is a chunk that depends only from one or multiple first level chunks (with first level chunks being independent (i.e., not depending from any other chunks)). As described below with regards to step 220, a third level chunk is a chunk that depends from at least one second level chunk, which in turn depends from at least one first level chunk. Thus, a third level chunk requires at least two chunks to be generated before the third level chunk is generated. A third level chunk can also have a configuration in which it depends from both at least one second level chunk and at least one first level chunk. Process 200 can be configured to allow for the generation of chunks 28 having any level of dependency (e.g., described herein as an "Nth" level chunk).

After determining a second level chunk 28 to generate, process 200 can include step 212, which is to formulate a query (by, for example, query module 36), search index 12 (by, for example, search engine 38), and determine/retrieve at least one relevant example chunk 14 (by, for example, search engine 38). Step 212 is similar to step 204 of process 200 and steps 106, 108, and 110 as described in process 100 shown in FIG. 2. Review this description with regards to steps 106, 108, and 110 for further details of the functionalities, capabilities, configurations, and/or other information of step 212.

Process 200 can include step 214, which is formulating the request to first LLM 34 by, for example, first prompt module 32 and/or by other components of system 10. The request as formulated in step 214 can include a prompt (states the desired purpose of the to-be-generated second level chunk 28), a context (provides topical information 16 and/or information dependent upon topical information 16), the at least one relevant example chunk 14, and the first level chunk(s) 28 upon which the to-be-generated second level chunk 28 depends. Aside from including the already-generated first level chunk(s) 28, the request as formulated in step 214 can be similar to the requests formulated in step 112 of process 100 and/or step 206 of process 200. Thus, review this description with regards to step 112 of process 100 and step 206 of process 200 for further details of the functionalities, capabilities, configurations, and/or other information of step 214.

Along with step 214, process 200 can include step 216, which is to assemble the request (by, for example, first prompt module 32), provide the request to first LLM 34 (which includes at least one first level chunk 28 from which the to-be-generated second level chunk 28 depends), and generate second level chunk 28 (by, for example, first LLM 34). Step 214 is similar to step 206 of process 200 and steps 114, 116, and 118 of process 100 as shown in FIG. 2. Review this description with regards to step 206 of process 200 and steps 114, 116, and 118 for further details of the functionalities, capabilities, configurations, and/or other information of step 216.

Process 200 can then include step 218, which is repeating one, multiple, or all of steps 210, 212, 214, and 216 to generate additional second level chunks 28 that depend from at least one first level chunk 28. Step 218 can be similar to step 208 described above, except that the request includes the newly generated first level chunk(s) 28 and the chunks 28 that are generated are second level chunks 28. Step 218 can be repeated as many times as is necessary to generate all of the second level chunks 28 that depend from already-generated first level chunks 28. For example, if document 18 is to include eight chunks 28 that are first level chunks (do not depend from other chunks 28) and four chunks 28 that are second level chunks (depend from at least one first level chunk 28), then step 218 (repeating the generation of one second level chunk) is performed three times, for a total generation of four second level chunks 28. For each time step 218 is performed, relevant example chunk(s) 14 can be determined/retrieved from index 12 depending on topical information 16, the desired purpose of the particular to-be-generated second level chunk 28 can be formulated, and/or other information relevant to the particular to-be-generated second level chunk 28 can be included in the corresponding request.

Finally, process 200 can include step 220, which is repeating steps 210, 212, 214, 216, and/or 218 for the remaining levels of chunks 28 (e.g., for Nth level chunks 28). Step 220 can be repeated for as many levels of chunks 28 as is necessary to generate all chunks 28 to complete document 18. The request as formulated in step 220 can include any number of already-generated chunks 28 having any level based on the Nth level chunk 28 that is to be generated and the dependencies thereby.

Process 200 can include sub-process 130 to evaluate each newly generated chunk 28 for hallucinations. It may be advantageous to evaluate each newly generated chunk 28 soon after being generated and before that newly generated chunk 28 is used in generating another, subsequent chunk 28 that depends from that newly generated chunk 28. The evaluation of the newly generated chunk 28 before being used in generating other chunks 28 may prevent or reduce the likelihood that those subsequent chunks 28 include information derived from a hallucination in the newly generated chunk 28. Additionally and/or alternatively, chunks 28 can be evaluated for hallucinations after all chunks 28 have been generated via process 200.

Figure 4:
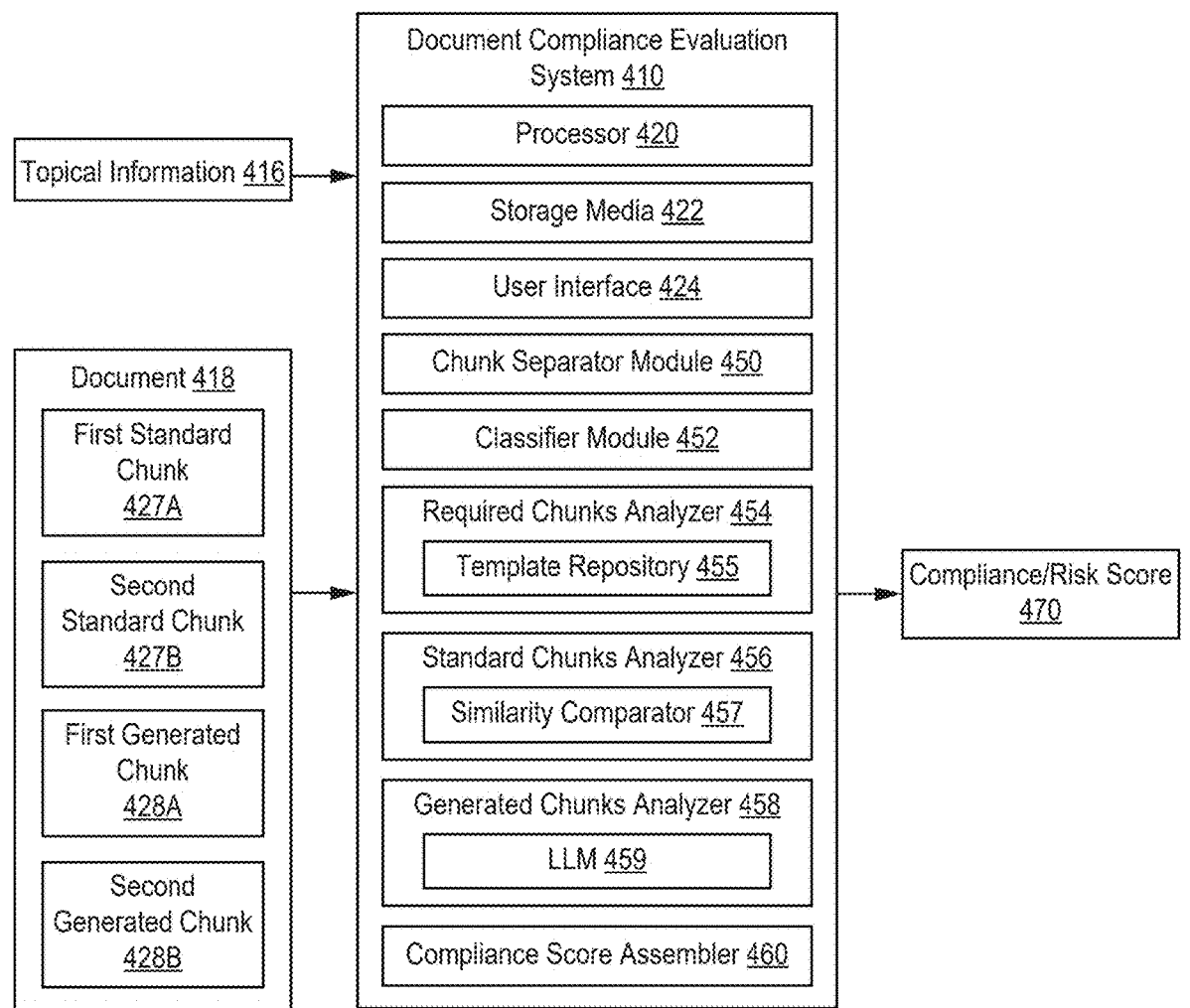
FIG. 4 is a block schematic diagram of an example document compliance evaluation system.

FIG. 4 is a block schematic diagram of an example document generation system 410 (herein referred to as "system 410"). System 410 can communicate with document generation system 10 and/or any other systems, processors, users, storage media, modules, models, and/or apparatuses to access, receive, and/or otherwise use any information and/or data necessary for the compliance evaluation of, for example, document 418. Document 18 as generated by system 10 can be the same or similar to document 418 as described with regards to FIG. 4, or document 418 can be a document that was not generated by system 10 but rather was created/generated by other methods, such as written up by an individual/user. Document 418 can include one or multiple standard chunks 427 (described herein individually as first standard chunk 427A and second standard chunk 428B; however, document 418 can have any number of standard chunks 427) and/or one or multiple generated chunks 428 (described herein individually as first generated chunk 428A and second generated chunk 428B; however, document 418 can have any number of generated chunks 428). Additionally, system 410 can access, receive, and/or otherwise use topical information 416 (which can be the same or similar to topical information 16 in FIG. 1) from sources external to system 410. System 410 can determine compliance/risk score 470 and/or provide compliance/risk score 470 to any location within and/or external to system 410, such as to a user. Compliance/risk score 470 can include information not expressly disclosed herein (such as information in addition to a value representative of the compliance of the chunk/document being evaluated) and/or can be presented in any physical and/or digital format, such as an electronic text value and/or values. System 410 can include, among other components not expressly disclosed herein, processor 420, storage media 422, and user interface 424 (which can be used to input topical information 416).

Further, system 410 can include chunk separator module 450, classifier module 452, required chunks analyzer 454 (having and/or being in communication with template repository 455), standard chunks analyzer 456 (having and/or being in communication with similarity comparator 457), generated chunks analyzer 458 (having and/or being in communication with LLM 459), and/or compliance score assembler 460. In some configurations, LLM 459 can be the same large language model as first LLM 34 and/or second LLM 46 as described with regards to FIG. 1. Alternatively, LLM 459 can be a distinct and separate large language model from first LLM 34 and second LLM 46. Similarity comparator 457 and/or LLM 459 can have a number of components and/or features not expressly disclosed herein, and can function in conjunction with and/or access the internet. Any of the components/systems shown in FIG. 4 can communicate with each other via any type of wired and wireless communication, including via the use of the internet.

FIG. 4 focuses on hardware components of document compliance evaluation system 10, and is provided as an illustrative example of a general hardware system for performing the capabilities discussed herein. The components presented in FIG. 4, particularly including modules/analyzers 450, 452, 454, 456, 458, and/or 460 can be omitted or replaced with analogous hardware and/or software in different architectures without departing from the scope and spirit of the present disclosure.

Document compliance evaluation system 410 (and process 500 described with regards to FIG. 5) can include other steps, components, modules, configurations, and/or features not expressly disclosed herein that are suitable for evaluating documents for compliance, among other capabilities. For example, system 410 can include any number of digital/electronic storage media (e.g., storage media 22) for storing document 418, data, information, and/or executable instructions. System 410 can include any number of computer processors (e.g., processor 420) for performing tasks/instructions with regards to system 410 and/or process 500. Further, system 410 can allow wired or wireless communication between components of system 410 and/or between other components, systems, individuals/users, etc. distant from system 410. System 410 is described herein as including one or multiple "modules," "analyzers," and/or "assemblers" which can be any hardware and/or software for performing the tasks, functionality, and/or capabilities described herein. These "modules," "analyzers," and/or "assemblers" can be instantiated in dedicated hardware and/or software, and/or can be defined functionally and use shared hardware and/or software.

As with system 10 described above, system 410 can be a discrete assembly or be formed by one or more components capable of individually or collectively implementing the functionalities described herein. In some examples, system 410 can be implemented as a plurality of discrete circuitry subassemblies. In some examples, one or all components of system 410 can include and/or be implemented at least in part on a smartphone or tablet, among other options. In some examples, one or all components of system 410 can include and/or be implemented as downloadable software in the form of a mobile application. The mobile application can be implemented on a computing device, such as a personal computer, tablet, or smartphone, among other suitable devices. One or all components of system 410 can be considered to form a single computing device even when distributed across multiple component computing devices. System 410 can include a configuration in which one, some, or all of the functions described herein are performed by different components. System 410 can include various components for performing the above functions (as well as other functions described in this disclosure), such as processor 420, storage media 422, and/or user interface 424.

Document compliance evaluation system 410 can access, receive, and/or otherwise use any information necessary/useful to the compliance evaluation of document 418, such as topical information 416, which can contain similar information to topical information 16 as described with regards to FIG. 1, and the use of topical information 416 by system 410 can be the same or similar to that of topical information 16 by system 10. Refer to the discussion of topical information 16 and system 10 for further information as to the configurations, functionalities, capabilities, uses, and/or other information regarding topical information 416 and the use of topical information 416 by system 410.

System 410 can access, receive, and/or otherwise evaluate document 418 for compliance with various standard language and practices, specified rules, preapproved templates/documents, general knowledge, industrial guidelines, and/or consistent information depending on the desired content and/or the type of document (e.g., a contract or SOW) that document 418 is intending to be and/or the purpose of document 418. Document 418 can be similar to document 18 and have some or all of the chunks in document 418 be generated by, for example, system 10. Additionally and/or alternatively, document 418 can have any content, any number of chunks that are standard chunks 427, and/or any number of chunks that are generated chunks 428. Standard chunks 427 are chunks classified as standard chunk types, which are chunks that include standard language/content related to the purpose/type of document (e.g., the document is a contract and the particular standard chunk is a legal clause describing the jurisdiction/venue that governs the contract). Document 418 may be comprised of a majority of chunks that are standard chunks 427, depending on the type of document 418. Generated chunks 428 are chunks classified as generated chunk types and/or chunks that are not classified as standard chunk types. Generated chunks 428 can include language/content that is at least partially generated by and/or with the use of an LLM, such as first LLM 34 in system 10. In some types of document 418, a majority of the chunks can be generated chunks 428. Generated chunks 428 can be similar to chunks 28 as described with regards to document 18 in FIG. 1. Document 418 can include other language, content, information, etc., such as headings/sub-headings, signature blocks, paragraph and/or page numbers, and/or other information. Document 418 can be stored and/or accessed at any location, including in storage media 422, in/at another component of system 410, and/or at another location distant from system 410. Document 418 can be accessed, received, and/or otherwise used via any communication means, including via the internet.

System 410 (and/or the components of system 410) can include one or multiple computer/data processors 420, storage media 422, and/or user interface 424. Processor 420, storage media 422, and/or user interface 424 can have the same configurations, functionalities, and/or capabilities as processor 20, storage media 22, and/or user interface 24, respectively as described with regards to system 10.

System 410 can be adjacent to (so as to be contained within one housing, system, etc.) any and/or all of template repository 455, similarity comparator 457, and/or LLM 459. Moreover, one component, multiple components, and/or all of system 410 can be distant from any or all of template repository 455, similarity comparator 457, and/or LLM 459. System 410 can communicate with template repository 455, similarity comparator 457, and/or LLM 459 via any type of communication and/or other processes/systems, such as through the use of the internet.

Document compliance evaluation system 410 can include chunk separator module 450, which can include and/or function in conjunction with any of the other components of system 410 (such as processor 420, storage media 422, and/or user interface 424). In another configuration, system 410 does not include chunk separator module 450, and the entirety of document 418 is analyzed at one time. Chunk separator module 450 can be configured to access, receive, and/or otherwise use document 418, and can be configured to separate document 418 into discrete chunks/sections. Chunk separate module 418 can separate document 418 so that each paragraph is a single chunk 427/428, each section (divided by headers, sub-headers, etc.) is a single chunk 427/428, and/or via other methods/factors. Chunk separator module 418 can store each chunk 427/428 individually as separate electronic files/elements, or chunk separator module 418 can denote, highlight, and/or otherwise specify the beginning, end, and/or bounds of each chunk 427/428 in document 418 and save that annotated document 418 for further use by document compliance evaluation system 410. Document 418, after being separated/divided into chunks/sections by chunk separation module 418, can be stored (either as one file/document or as multiple individual files/documents) at any location within and/or distant from document compliance evaluation system 410, including in storage media 422.

System 410 can include classifier module 452, which can include and/or function in conjunction with any of the other components of system 410 (such as processor 420, storage media 422, and/or user interface 424). Classifier module 452 can be configured to access, receive, and/or otherwise use document 418 and/or chunks 427/428 before or after chunks 427/428 have been separated/divided by chunk separator module 450. Classifier module 452 is configured to analyze each chunk 427/428 and determine whether the chunk is a standard chunk type or a nonstandard/generated chunk type. Classifier module 452 can perform the analysis/determination of whether the chunk is a standard or nonstandard/generated chunk type via the use of LLM 459 and/or other programs/software/components. In one example, classifier module 452 can analyze/determine the type of chunk by comparing each chunk 427/428 to template/example chunks. If the chunk 427/428 is substantially similar to a template/example chunk (e.g., is above a predefined threshold of similarity, such as 70% similar), classifier module 452 could determine that the chunk 427/428 is a standard chunk type. If the chunk 427/428 is not substantially similar to a template/example chunk, classifier module 452 could determine that the chunk 427/428 is a nonstandard/generated chunk type. If classifier module 452 includes and/or uses LLM 459, LLM 459 can be requested to analyze the chunk 427/428 to determine if the chunk 427/428 was previously generated by an LLM such that the chunk 427/428 is a nonstandard/generated chunk type. Classifier module 452 can include other factors, processes, components, and/or methods for evaluating the chunks 427/428 and determining each chunk type. Classifier module 452 can tag, label, highlight, and/or otherwise denote the chunk type on any analyzed chunk 427/428 and/or information associated with any analyzed chunk 427/428, and store each chunk 427/428 (and/or the entirety of document 418 that is annotated/labeled with each chunk type) at any location within and/or distant from system 410, including in storage media 422. Additionally and/or alternatively, classifier module 452 can be in communication with any of the other components of system 410 to, for example, communicate annotated document 418 and/or labeled/classified chunks 427/428 for further analysis. In one example, after classifier module 452 determines the chunk type of chunk 427/428, chunk 427/428 is then communicated to required chunks analyzer 454, standard chunks analyzer 456, and/or generated chunks analyzer 458 depending on the chunk type.

System 410 can include required chunks analyzer 454, which can include and/or work in conjunction with template repository 455 and/or any other components of system 410, such as processor 420, storage media 422, and/or user interface 424. Required chunks analyzer 454 can review individuals chunks 427/428 and/or the entirety of document 418 to determine if document 418 includes all sections/chunks 427/428 that are required depending on the type of document that is document 418. For example, if document 418 is a statement of work (i.e., SOW) for the development of a software program, document 418 can be compared by required chunks analyzer 454 to a template for a SOW for the development of a software program (with the template being in template repository 455). The template for the particular document can include annotations/labeling that denote which chunks in the document/template are required to be present in the similarly configured/contents of document 418. Required chunks analyzer 454 can compare the required chunks as set out in the template to chunks/sections 427/428 in document 418 to ensure all required chunks are present in document 418. This comparison can be performed by, for example, similarity comparator 457, LLM 459, and/or other components/systems. As with other components of system 410, the similarity can be set at a predefined threshold such that a chunk that is above, for example, 70% similarity to a corresponding required chunk is determined to satisfy the requirement that that chunk is present in document 418. This analysis can be performed for each chunk designated as being required in the template with regards to the corresponding document 418.

Each required chunk as set out in the template can have a corresponding importance value/score that factors into the compliance score of document 418, with some required chunks/sections being more important than others. For example, document 418 that is a SOW can be determined to require a deliverables section/chunk. Thus, if document 418 is determined by required chunks analyzer 454 to be missing the deliverables section/chunk, the importance value, and thus the compliance score for document 418, could reflect that document 418 fails the compliance evaluation, even if all other chunks 427/428 are present and in compliance. In another example, a missing required chunk in document 418 may not result in a definitive failure of document 418 with regards to the compliance evaluation, but can result in a notification to the user that accepting/using document 418 is risky and may want to be avoided. Additionally and/or alternatively, required chunks analyzer 454 can include and/or be in communication with alert/notification systems/components that notify a user of any required chunks that are missing from document 418 so that a user can, if desired, introduce those required chunks into document 418. This score, which can be designated in this disclosure as a minimum required chunks score, can have any value representative of the extent to which document 418 does or does not include required chunks as specified in, for example, the template. The minimum required chunks score can be a score on its own and/or can be factored into (e.g., make up a portion of) the overall compliance score 470 of document 418.

Template repository 455 can include any number of templates/documents having any chunks with contents, labels, etc. for use in determining if the specific document 418 includes one or all required chunks. Additionally and/or alternatively, template repository 455 can be used by standard chunks analyzer 456 (which in turn can use/include similarity comparator 457) and/or generated chunks analyzer 458 (which in turn can use/include LLM 459) by having template documents and/or chunks to which document 418 and/or chunks 427/428 are compared and/or analyzed. Template repository 455 can be within, use, and/or include storage media 422 to store the template documents and/or chunks. In another example, template repository 455 can be located within and/or distant from system 410. As described above, template documents and/or chunks in template repository 455 can include accompanying information, such as the type of document and/or chunk and/or any other annotation, labeling, and/or information. The template documents and/or chunks can be added to template repository 455 at any time, including before, during, and/or after the evaluation of document 418 by system 410. Moreover, the template documents and/or chunks can be added to, modified, and/or deleted as desired by any user and/or other individual using and/or familiar with system 410.

System 410 can include standard chunks analyzer 456, which can include and/or work in conjunction with similarity comparator 457 and/or any other components of system 410, such as processor 420, storage media 422, and/or user interface 424. Standard chunks analyzer 456 can review/analyze standard chunks 427 and determine a similarity score for each chunk 427 representative of the difference in that chunk 427 to a template chunk with the same intended content and/or purpose as the standard chunk 427. Standard chunks analyzer 456 can analyze chunk 427 to determine a purpose of the chunk 427. Using the content and/or purpose of the chunk 427, standard chunks analyzer 456 can access, receive, retrieve, and/or otherwise use a template chunk having a similar content and/or purpose as chunk 427. Then, standard chunks analyzer 456 can, for example via similarity comparator 457, determine a similarity score representative of the similarity between the chunk 427 and the corresponding template chunk. Similarity comparator 457 can be or function similarly to search engine 38 of system 10 shown in FIG. 1. In another example, the comparison and determination of the similarity score can be performed by LLM 459 and/or another component, system, process, and/or configuration. Standard chunks analyzer 456 (which can include and/or function in conjunction with similarity comparator 457, LLM 459, and/or other components) can make the comparison by, for example, converting chunk 427 to a vector embedding. The corresponding template chunk can be converted to a vector embedding or, if already converted to a vector embedding, retrieved and/or accessed. The vector embedding for chunk 427 can then be compared to the vector embedding for the template chunk. The similarity/difference in the vector embeddings can be used to determine the similarity score of chunk 427 to the template chunk. In one example, this similarity/difference in the vector embeddings is equal to the similarity score. In another example, the similarity/difference in the vector embeddings is normalized. In other examples, other processes are used to compare the two chunks and/or determine the similarity score. The above example process can be repeated for multiple chunks 427 of document 418 (either in series and/or concurrently), and the similarity score can be an aggregate of the determinations/comparisons of each chunk 427 to a corresponding template chunk.

System 410 can include generated chunk analyzer 458, which can include and/or work in conjunction with LLM 459 and/or other components of system 410, such as processor 420, storage media 422, and/or user interface 424. Generated chunk analyzer 458 can review/analyze generated chunks 428 to determine if each generated chunk 428 includes at least one hallucination. System 410, such as generated chunk analyzer 458, can provide the particular generated chunk 428 to LLM 459 and prompt the LLM 459 to evaluate generated chunk 428 for at least one hallucination. LLM 459 can then determine a hallucination score representative of, for example, an amount of the generated chunk 428 that is part of a hallucination. The hallucination can be created/generated when the generated chunk 428 was generated by another LLM, such as first LLM 34 of system 10. The analysis of generated chunk 428 for at least one hallucination can be performed similarly, and with similar components, to that described with regards to document evaluation module 42 (having second prompt module 44 and/or second LLM 46) and/or sub-process 130 shown in FIG. 2. Refer to the description with regards to those components and/or processes for further information.

Generated chunk analyzer 458 (and/or LLM 459) can, in addition to determining if generated chunk 428 includes at least one hallucination, determine the hallucination score dependent upon whether the generated chunk 428 includes any hallucinations, the amount of the generated chunk 428 that is a hallucination (e.g., the ratio of words/phrases/ sentences that are hallucinations to the total number of words/phrases/sentences), the content/elements of the generated chunk 428 that are hallucinations, and/or other factors/aspects. In another example, the determination/evaluation of the generated chunk 428 and/or the determination of the hallucination score can be performed by and/or in conjunction with second LLM 46 and/or other components. The hallucination score can represent the risk of using the generated chunk 428 in document 418. For example, generated chunk 428 can include content regarding the deliverables in a SOW, and generated chunks analyzer 458 can evaluate/determine whether the generated chunk 428 includes at least one hallucination and/or to what extent the hallucination alters/affects the content (e.g., the description of the deliverables). Dependent on this, generated chunks analyzer 458, and/or one or multiple other components of system 410, can determine the hallucination score. The hallucination score can be normalized to, for example, a value between 0 and 1. The above example process can be repeated for multiple generated chunks 428 of document 418 (either in series and/or concurrently), and the hallucination score can be an aggregate of the determinations/evaluations of each generated chunk 428 for hallucinations.

System 410 can include compliance score assembler 460, which can include and/or work in conjunction with any components of system 410, including processor 420, storage media 422, and/or user interface 424. Compliance score assembler 460 can be in communication with any of the components of system 410, including required chunks analyzer 454, standard chunks analyzer 456, and/or generated chunks analyzer 458 to access, receive, and/or otherwise use the minimum required chunks score(s), the similarity score (s), and/or the hallucination score(s) to determine/assemble a total compliance/risk score 470 of document 418. Compliance score assembler 460 can be in communication with any systems and/or components distant from system 410 to communicate the compliance score 470 (and/or other information) to any location, such as a user's computer terminal and/or another location via, for example, an email, a notification, an alert, and/or another communication. Compliance score assembler 460 can generate compliance score 470 using a variety of methods, with the compliance score 470 being reflective of a level of compliance of document 418. In one example, the compliance score 470 is normalized so as to be a value between 0 and 1, with 0 being noncompliant and 1 being compliance. In another example, the compliance score 470 is an equal representation of the aggregated minimum required chunks score from document 418, the aggregated similarity scores of standard chunks 427 of document 418, and the aggregated hallucination scores of generated chunks 428 of document 418. In this example, each of the types of scores is weighted to account for ⅓ of the compliance score 470. In another example, the three types of scores are weighted differently so that the three types of scores do not equally account for (e.g., make up the same proportion of) the compliance score 470. The compliance score 470 can, for example, be formulated so as to be 20% from the minimum required chunks score, 50% from the similarity score, and 30% from the hallucination score of document 418. The compliance score 470 can be comprised of any weight/ratio of any of the scores and/or information regarding the compliance of document 418. The compliance score 470 can also include other information alternative to and/or in addition to a score/value. In one example, the compliance score 470 can include information stating that document 418 is not in compliance due to the omission of a required chunk but that document 418 would be in compliance if that required chunk was included in document 418. In another example, the compliance score 470 can include instructions as to changes/edits that can be made to document 418 to bring document 418 into compliance. Further, the compliance score 470 can be for the entirety of document 418 such that all chunks 427/428 in document 418 contribute to the compliance score 470 (and can contribute equally and/or unequally to the compliance score 470). Alternatively, the compliance score can be for one section, one chunk 427/428, and/or another sub-portion of document 418.

In one example, document 418 is a contract that was drafted by a first party and sent to a second party for acceptance (e.g., for signature). Document 418 can then be edited by the second party, signed, and returned to the first party. The first party can then use document compliance evaluation system 410 to determine if any changes/edits have been made to document 418 and to determine if document 418 that includes those changes/edits is in compliance with (e.g., acceptable by) the first party's expectations. In this example, the template document is the unedited version of that document and the edited version is document 418 such that the edited version is compared to the unedited version for compliance. In this example, the first document 418 (e.g., the document first sent to the second party) has previously been reviewed by legal and approved so as to be in compliance and can serve as the template document. One example of the process for evaluating document 418 for compliance is shown in FIG. 5.

FIG. 5 is a method flow chart describing example process 500 for evaluating document 418 having multiple chunks (standard chunks 427 and/or generated chunks 428) for compliance.

While process 500 is described herein as being used with regards to document compliance evaluation system 410, process 500 can be performed by any system having any components, capabilities, configurations, and/or functionalities suitable for performing process 500. Additionally, process 500 can include other steps not expressly disclosed herein and/or can include performing the disclosed steps in any order and/or multiple times as is desired and/or necessary to evaluate documents for compliance. Moreover, in some example configurations, not all steps of process 500 must be performed, and process 500 can be performed partially and/or entirely in a digital environment by and/or within the systems/components set out in FIG. 5, such as document compliance evaluation system 410 and/or other systems/components. In some example configurations, one, multiple, or all of the steps of process 500 can be integrated into any of processes 100 and/or 200 such that the steps of process 500 can be performed concurrently and/or in series with one, multiple, or all of the steps of processes 100 and/or 200.

First, process 500 can include step 502, which is accessing, receiving, and/or otherwise using document 418 in the evaluation of document 418 for compliance. System 410 can, for example, receive document 418 from any location within and/or distant from system 410, such as from a user. In one example, as described above, document 418 can be a contract (e.g., a SOW) that is edited and signed by another party, with document 418 intending to be evaluated for compliance before being accepted by the user. Document 418 can be accessed, received, and/or otherwise used in any format, such as a text document, a PDF, a Word document, a physical document, and/or another electronic and/or physical format. Document 418, as described above, can include one or multiple standard chunks 427A/427B (collectively referred to herein as "standard chunks 427") and/or one or multiple nonstandard/generated chunks 428A/428B (collectively referred to herein as "generated chunks 428") that are to be evaluated for compliance (along with document 418 as a whole with regards to the minimum required chunks).

Next, process 500 can include step 504, which is separating document 418 into multiple chunks 427/428. Step 504 can be performed by, for example, chunk separator module 450 and/or any other components of system 410. Step 504 can include separating document 418 into discrete chunks/sections. Document 418 can be separated such that each paragraph is a single chunk 427/428, each section (divided by headers, sub-headers, etc.) is a single chunk 427/428, and/or document 418 is separated via other methods/factors. Step 504 can include storing each chunk 427/428 as separated/designated in step 504 individually as separate electronic files/elements, and/or step 504 can include denoting, highlighting, and/or otherwise specifying the beginning, end, and/or bounds of each chunk 427/428 in document 418 and/or saving that annotated document 418 for further use. Thus, step 504 that separates document 418 into chunks 427/428 can simply include just denoting the bounds of each chunk 427/428 in document 418. Step 504 can further include saving document 418 and/or the individual chunks 427/428 at any location within and/or distant from system 410.

Process 500 can include step 506, which is classifying each chunk 427/428 as a standard chunk type or a nonstandard/generated chunk type. Step 506 can be performed by, for example, classifier module 452 and/or any other components of system 410. Step 506 can include accessing, receiving, and/or otherwise using document 418 and/or chunks 427/428 before and/or after chunks 427/428 have been separated/divided in step 504. Step 506 (i.e., the classification of each chunk 427/428) can be performed using LLM 459 and/or other programs, software, components, etc. In one example, step 506 can include analyzing/determining the type of chunk by comparing each chunk 427428 to template/example chunks. If the chunk 427/428 is substantially similar to a template/example chunk (e.g., is above a predefined threshold of similarity), step 506 can include determining that the chunk 427/428 is a standard chunk type. If the chunk 427/428 is not substantially similar to a template/example chunk, step 506 can include determining that the chunk 427/428 is a nonstandard/generated chunk type. Step 506 can include using other factors, processes, components, and/or methods for evaluating chunks 427/428 and determining the chunk type of each chunk 427/428. Step 506 can further include tagging, labeling, highlighting, and/or otherwise denoting the chunk type on any analyzed chunk 427/428 and/or within document 418, and storing each chunk 427/428 (and/or the entirety of document 418 that is annotated/labeled with each chunk type) at any location, such as storage media 422. Step 506 can include communicating the chunks 427/428 to any components of system 410 and/or to any locations. Step 506 can be performed in conjunction with (e.g., at the same time as) any or all of steps 512 and 516 so that the classification of each chunk 427/428 also includes evaluating each chunk 427/428 for compliance.

Process 500 can include step 508, which is evaluating document 418 to determine if document 418 includes all required chunks necessary for document 418 to be in compliance. Step 508 can include reviewing/evaluating one or multiple individual chunks 427/428 and/or the entirety of document 418 to determine if document 418 includes all sections/chunks 427/428 that are required depending on the type of document that is document 418. For example, if document 418 is a statement of work (i.e., a SOW) for the development of a software program, document 418 can be compared in step 508 to a template for a SOW for the development of a software program. The template for the specific document can include annotations/labeling that denote which chunks in the document/template are required to be present in the similarly configured contents of document 418 and/or chunks 427/428. Step 508 can include comparing the required chunks as set out in the template to chunks/sections 427/428 in document 418 to ensure all required chunks are present in document 418. This comparison can be performed by, for example, similarity comparator 457, LLM 459, and/or other components/systems. As with other components of system 410, the similarity can be set at a predefined threshold such that a chunk that is above, for example, 70% similarity to a corresponding required chunk is determined to satisfy the requirement that that chunk is present in document 418. This analysis can be performed for each chunk designated as being required in the template with regards to the corresponding document 418. Additionally and/or alternatively, step 508 can include communicating with alert/notification systems/components that notify a user of any required chunks that are missing from document 418 so that a user can, if desired, introduce those required chunks into document 418.

Process 500 can include step 510, which is determining a minimum required chunks score dependent upon the evaluation in step 508. Step 510 can be performed by, for example, required chunks analyzer 454 and/or any other components of system 410. Each required chunk as set out in the template can have a corresponding importance value/score that factors into the minimum required chunks score determined by process 500, with some required chunks/sections being more important than others (e.g., having a greater weight and/or factoring a greater or lesser extent to the minimum required chunks score). For example, document 418 that is a SOW can be determined to require a deliverables section/chunk. Thus, if document 418 is determined in step 508 to be missing the deliverables section/chunk, the importance value, and thus the minimum required chunks score for document 418, could reflect that document 418 fails the compliance evaluation, even if all other chunks 427/428 are present and in compliance. In another example, a missing required chunk in document 418 may not result in a definitive failure of document 418 with regards to the compliance evaluation, but can results in a notification to the user that accepting/using document 418 is risky and may want to be avoided. This minimum required chunks score can have any value representative of the extent to which document 418 does or does not include required chunks as specified in, for example, the template. The minimum required chunks score can be a score on its own and/or can be factored into (e.g., form a portion of) the overall compliance score 470 of document 418. In some configurations of process 500, steps 508 and 510 are not performed. In such a configuration, a user may not be concerned that all required chunks are present in document 418 and/or may be confident that all required chunks are present in document 418. In such a configuration/example, compliance score 470 would not include and/or factor in any information regarding the required chunks score.

Process 500 can include step 512, which is evaluating each standard chunk 427 for compliance by, for example, comparing each standard chunk 427 to a corresponding template chunk (e.g., example/template chunks found in template repository 455). Step 512 can be performed by, for example, standard chunks analyzer 456 and/or any other components of system 410. Step 512 can include accessing, receiving, and/or otherwise using document 418 and/or standard chunks 427. Step 512 can be performed before and/or after standard chunks 427 have been separated/divided in step 504, and/or step 512 can be performed within step 504 being performed in process 500. Step 512 can include evaluating/analyzing each standard chunk 427 for similarities/differences in that chunk 427 as compared to a template chunk with the same (or a similar) intended content as the standard chunk 427. Step 512 can include analyzing each standard chunk 427 to determine the content and/or purpose of each chunk 427. Using that content and/or purpose of each standard chunk 427, step 512 can include accessing, receiving, and/or otherwise using a template chunk having a similar content and/or purpose as the standard chunk 427. Then, step 512 can, for example via standard chunks analyzer 456 and/or similarity comparator 457, determine the similarity between the standard chunk 437 and the template chunk having a similar intended purpose. As described in step 514, the similarity between the two chunks can be represented by a similarity score or by multiple similarity scores (one for each standard chunk 427 and/or one for the entirety of the standard chunks 427 in document 418). In another example, step 512 can be performed by LLM 459, which determines the similar template chunk and compares the standard chunk 427 to the template chunk, and/or by another component, system, process, and/or configuration. In one example, step 512 includes converting standard chunk(s) 427 into one or multiple vector embeddings. The corresponding template chunk can be converted to a vector embedding or, if already converted to a vector embedding, retrieved and/or accessed. The vector embedding for chunk 427 can then be compared to the vector embedding for the template chunk. The similarity/difference in the vector embeddings can be used to determine the similarity score of chunk 427 to the template chunk in step 514 (detailed below). Step 512 can include other processes and/or additional sub-steps that evaluate each standard chunk 427 in document 418 for differences as compared to corresponding template chunks.

Process 500 can then include step 514, which is determining the similarity score for each standard chunk 427 dependent upon the evaluation of each standard chunk 427 performed in step 512. The similarity score as determined in step 514 can be any value and/or information representative of the similarities/differences between each standard chunk 427 and each corresponding template chunk as evaluated in step 512. Step 514 can be performed by, for example, standard chunk analyzer 456, similarity comparator 457, LLM 459, and/or any other components of system 410. The similarity score(s) can be determined in step 514 via a variety of methods and can represent a variety of factors. The similarity score can be a value representative of the similarities/differences of all standard chunks 427 in document 418 to corresponding template chunks, or the similarity score can be a value representative of each individual standard chunk 427 as compared to a corresponding template chunk. Further, the similarity score(s) can be weighed such that certain words, phrases, sentences, etc. that are the same and/or different between the standard chunk 427 and the corresponding template chunk do not factor into the similarity score(s). In the example above with regards to the standard chunks 427 and the template chunks being represented by and converted into vector embeddings, the similarity score can be the similarity/difference between the vector embeddings. In another example, the similarity/difference in the vector embeddings is normalized. In other examples, other processes and/or sub-steps are used to compare the two chunks and/or determine the similarity score. The above example step 514 can be repeated for multiple chunks 427 of document 418 (either in series and/or concurrently), and the similarity score can be an aggregate of the determinations/comparisons of each chunk 427 to a corresponding template chunk such that the similarity score represents the similarity score(s) for all chunks 427 in document 418.

Process 500 can include step 516, which is evaluating each nonstandard/generated chunk 428 for compliance by determining if each nonstandard/generated chunk 428 includes at least one hallucination. Step 516 can be performed by, for example, generated chunks analyzer 456, LLM 459, and/or any other components of system 410. Step 516 can include evaluating/analyzing each generated chunk 428 to determine if each generated chunk 428 includes at least one hallucination. Step 516 can be performed before and/or after nonstandard/generated chunks 428 have been separated/divided in step 504, and/or step 516 can be performed within step 504 being performed in process 500. Step 516 can include providing each generated chunk 428 to LLM 459 as well as prompting LLM 459 to evaluate the provided generated chunk 428 for at least one hallucination. Step 516 can be performed similarly to one or multiple steps of sub-process 130 shown in FIG. 2 to determine whether generated chunk(s) 428 includes one or multiple hallucinations.

Process 500 can also include step 518, which is determining a hallucination score, for example, by LLM 459. The hallucination score can be representative of whether the chunk 428 includes at least one hallucination, the amount of information in chunk 428 that is a hallucination, the severity/importance of the information that is a hallucination, the content/elements of chunk 428 that are hallucinations, and/or other factors/aspects. In another example, the hallucination score can be representative of the risk of using the generated chunk 428 in document 418. For example, generated chunk 428 can include content regarding the deliverables in a SOW, and step 516 can evaluate/determine whether the generated chunk 428 includes at least one hallucination and/or to what extend the hallucination alters/affects the content (e.g., the description of the deliverables). In another example, the hallucination score can be representative of the likelihood that the analyzed generated chunk 428 includes at least one hallucination. The hallucination score can be normalized to, for example, a value between 0 and 1. Step 518 (and/or one or multiple other steps in process 500) can be repeated for multiple generated chunks 428 of document 418 (either in series and/or concurrently). In another configuration, the hallucination score can be an aggregate of the evaluation in step 516 of all generated chunks 428 in document 418 such that document 418 only has one hallucination score as opposed to one hallucination score for each generated chunk 428.

Process 500 can include step 520, which is formulating a compliance score 470 for document 418 dependent upon at least one of the minimum required chunks score, the similarity score(s), and/or the hallucination score(s) previously determined with regards to document 418 and/or chunks 427/428. Step 520 can be performed by, for example, compliance score assembler 460 and/or any other components of system 410. Step 520 can include accessing, receiving, and/or otherwise using the minimum required chunks score, the similarity score(s), and/or the hallucination score (s) determined in prior steps of process 500. Step 520 can include communicating with any systems and/or components distant from system 410 and/or the system/component that is performing step 520 to communicate compliance score 470 (and/or other information) to any location, such as a user's computer terminal and/or another location via, for example, email, a notification, an alert, and/or another communication.

The formulation of compliance score 470 in step 520 can be performed using any methods, theories, determinations, and/or processes with compliance score 470 being reflective of the level of compliance of document 418. In one example, the compliance score 470 is normalized so as to be a value between 0 and 1, with 0 being noncompliant and 1 being compliance. In another example, the compliance score 470 is an equal representation of the aggregated minimum required chunks score for document 418, the aggregated similarity scores of standard chunks 427 of document 418, and the aggregated hallucination scores of generated chunks 428 of document 418. In this example, each of the types of scores is weighted to account for ⅓ of the compliance score 470. In another example, the three types of scores are weighted differently so that the three types of scores do not equally account for (e.g., form the same portion of) the compliance score 470. The compliance score 470 can, for example, be formulated so as to be 20% from the minimum required chunks score, 50% from the similarity score, and 30% from the hallucination score of document 418. The compliance score 470 can be comprised of any weight/ratio of any of the scores and/or information regarding the compliance of document 418. For example, the compliance score 470 can be formed from only the similarity score and the hallucination score of document 418. The compliance score 470 can also include other information alternative to and/or in addition to a score/value. In one example, the compliance score 470 can include information stating that document 418 is not in compliance due to the omission of a required chunk but that document 418 would be in compliance if that required chunk was included in document 418. In another example, the compliance score 470 can include instructions as to changes/edits that can be made to document 418 to bring document 418 into compliance. Further, the compliance score 470 can be for the entirety of document 418 such that all chunks 427/428 in document 418 contribute to the compliance score 470 (and can contribute equally and/or unequally to the compliance score 470). Alternatively, the compliance score can be for one section, one chunk 427/428, and/or another sub-portion of document 418.

System 410 and/or process 500 is configured to determine whether document 418, which can have standard and/or nonstandard/generated sections/chunks 427 and/or 428, respectively, is in compliance with standard language and practices, specified rules, preapproved templates/documents, generally knowledge, industrial guidelines, and/or consistent information. System 410 and/or process 500 can utilize any systems and/or components, such as similarity comparator 457 (which can be a search engine that uses the internet) and/or LLM 459 (which can also use the internet). The evaluation of document 418 for compliance can result in system 410 and/or process 500 formulating compliance score 470, which can include one or multiple values representative of the compliance (and/or noncompliance) of document 418 and/or of portion of document 418. Compliance score 470 can also include other information additional and/or alternative to a value/score, such as an explanation as to why the document is deemed to be noncompliant, instructions as to edits/changes that can be made to document 418 to bring it into compliance, and/or considerations that should be made/contemplated with regards to specific language and/or sections in document 418.

System 410 and/or process 500 can perform the above detailed evaluation of document 418 (and other documents) automatically in response to receiving and/or otherwise accessing document 418. Additionally, system 410 and/or process 500 can be configured to perform multiple evaluations of multiple different documents 418 for compliance concurrently and/or in series. Moreover, system 410 can perform one, multiple, or all of the steps in process 500 and/or other steps expressly disclosed herein, and system 410 can include other components not expressly disclosed herein. Further, process 500 can be performed by systems other than system 410.

The following are nonlimiting examples of the above disclosure:

A method of evaluating a first document for compliance is disclosed herein that includes separating the first document into multiple chunks of text and evaluating a first chunk of the multiple chunks of text to determine whether the first chunk is a standard chunk type or a nonstandard chunk type. In response to the first chunk being a standard chunk type, the method can include determining a purpose of the first chunk, retrieving a first template chunk having a similar purpose, and determining a first similarity score representative of a similarity between the first chunk and the first template chunk. In response to the first chunk being a nonstandard chunk type, the method can include providing the first chunk to a first large language model, prompting the first large language model to evaluate the first chunk for a hallucination, determining (by the first large language model) a first hallucination score representative of at least an amount of the first chunk that is a hallucination created when the first chunk was generated by another large language model, and formulating a compliance score dependent on the first similarity score or the first hallucination score with the compliance score being representative of a level of compliance of the first chunk.

The method can further include evaluating a second chunk of the multiple chunks of text to determine whether the second chunk is a standard chunk type or a nonstandard chunk type. In response to the second chunk being a standard chunk type, the method can include determining a purpose of the second chunk, retrieving a second template chunk having a similar purpose, and determining a second similarity score representative of a similarity between the second chunk and the second template chunk. In response to the second chunk being a nonstandard chunk type, the method can include providing the second chunk to the first large language model, prompting the first large language model to evaluate the second chunk for a hallucination, and determining, by the first large language model, a second hallucination score representative of an amount of the first chunk that is a hallucination, wherein the compliance score is dependent on the first similarity score, the first hallucination score, the second similarity score, and the second hallucination score with the compliance score being representative of a level of compliance of the first document.

The method can further include that the evaluation of the first chunk and the evaluation of the second chunk are performed concurrently.

The method can further include evaluating each chunk of the multiple chunks similarly to the evaluation of the first chunk and the evaluation of the second chunk, wherein the compliance score is representative of all similarity scores and hallucination scores from each chunk of the multiple chunks.

The method can further include evaluating the first document as a whole to determine whether the first document includes all required chunks of the multiple chunks of text by comparing the first document to a first template document, wherein the first document and the first template document are the same type of document, and formulating a minimum required chunks score dependent upon the comparison of the first document to the second document.

The method can further include that the compliance score is also dependent upon the required chunks score.

The method can further include that the first template document is saved in a template repository.

The method can further include that the first document is a contract that has been edited by a first party and the first template document is an unedited version of the first document.

The method can further include that each of the first similarity score, the first hallucination score, and the minimum required chunks score are equally represented in the compliance score.

The method can further include, in response to the evaluation of the first document revealing that the first document does not include all required chunks, communicating a notification to a user.

The method can further include that the first hallucination score is additionally representative of at least one of: a number of hallucinations present in the first chunk and a content of the first chunk that is a hallucination.

The method can further include that the first document is a contract that is a statement of work.

The method can further include normalizing the compliance so as to be a value between 0 and 1.

The method can further include evaluating each chunk of the multiple chunks, wherein the compliance score is representative of all similarity scores and hallucination scores.

The method can further include communicating the compliance score to a user.

The method can further include that the step of determining a first similarity score representative of the similarity between the first chunk and the first template chunk further comprises converting the first chunk to a first vector embedding, retrieving a second vector embedding corresponding to the first template chunk, and comparing the first vector embedding to the second vector embedding to determine the similarity between the first chunk and the first template chunk, wherein the first similarity score is representative of the similarity between the first vector embedding and the second vector embedding.

The method can further include that the determination of whether the first chunk is a standard chunk type or a nonstandard chunk type is performed by a classifier module that at least partially includes a computer processor.

The method can further include that the step of separating the first document into multiple chunks of text is performed automatically by a chunk separator module that at least partially includes a computer processor.

The method can further include receiving the first document and storing the first document in storage media.

The method can further include that the nonstandard chunk type is a chunk that was generated via a second large language model.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of determining a compliance of a first document and ensuring the first document does not include a hallucination using a first large language model, the method comprising:

separating, by a compliance evaluation system having at least one computer processor, the first document into multiple chunks of text;

evaluating a first chunk of the multiple chunks of text to determine whether the first chunk is a standard chunk type or a nonstandard chunk type, wherein:

in response to the first chunk being a standard chunk type:

determining a purpose of the first chunk;

retrieving a first template chunk having a similar purpose; and determining a first similarity score representative of a similarity between the first chunk and the first template chunk;

in response to the first chunk being a nonstandard chunk type;

providing the first chunk to the first large language model;

prompting the first large language model to evaluate the first chunk for a hallucination; and determining, by the first large language model, a first hallucination score representative of at least an amount of the first chunk that is a hallucination created when the first chunk was generated by another large language model;

evaluating, concurrently with the evaluation of the first chunk, a second chunk of the multiple chunks of text to determine whether the second chunk is a standard chunk type or a nonstandard chunk type, wherein:

in response to the second chunk being a standard chunk type:

determining a purpose of the second chunk;

retrieving a second template chunk having a similar purpose; and determining a second similarity score representative of a similarity between the second chunk and the second template chunk;

in response to the second chunk being a nonstandard chunk type;

providing the second chunk to the first large language model;

prompting the first large language model to evaluate the second chunk for a hallucination; and determining, by the first large language model, a second hallucination score representative of an amount of the second chunk that is a hallucination; and formulating a compliance score dependent on the first similarity score, the first hallucination score, the second similarity score, and the second hallucination score with the compliance score being representative of a level of compliance of the first document.

2. The method of claim 1, further comprising:
evaluating each chunk of the multiple chunks similarly to the evaluation of the first chunk and the evaluation of the second chunk, wherein the compliance score is representative of all similarity scores and hallucination scores from each chunk of the multiple chunks.

3. The method of claim 1, further comprising:
evaluating the first document as a whole to determine whether the first document includes all required chunks of the multiple chunks of text by comparing the first document to a first template document, wherein the first document and the first template document are the same type of document; and formulating a minimum required chunks score dependent upon the comparison of the first document to the second document.

4. The method of claim 3, wherein the compliance score is also dependent upon the required chunks score.

5. The method of claim 3, wherein the first template document is saved in a template repository.

6. The method of claim 3, wherein the first document is a contract that has been edited by a first party and the first template document is an unedited version of the first document.

7. The method of claim 3, wherein each of the first similarity score, the first hallucination score, and the minimum required chunks score are equally represented in the compliance score.

8. The method of claim 3, further comprising:
in response to the evaluation of the first document revealing that the first document does not include all required chunks, communicating a notification to a user.

9. The method of claim 1, wherein the first hallucination score is additionally representative of at least one of: a number of hallucinations present in the first chunk and a content of the first chunk that is a hallucination.

10. The method of claim 1, wherein the first document is a contract that is a statement of work.

11. The method of claim 1, further comprising:
normalizing the compliance so as to be a value between 0 and 1.

12. The method of claim 1, further comprising:
evaluating each chunk of the multiple chunks, wherein the compliance score is representative of all similarity scores and hallucination scores.

13. The method of claim 1, further comprising:
communicating the compliance score to a user.

14. The method of claim 1, wherein the step of determining a first similarity score representative of the similarity between the first chunk and the first template chunk further comprises:
converting the first chunk to a first vector embedding;
retrieving a second vector embedding corresponding to the first template chunk; and
comparing the first vector embedding to the second vector embedding to determine the similarity between the first chunk and the first template chunk, wherein the first similarity score is representative of the similarity between the first vector embedding and the second vector embedding.

15. The method of claim 1, wherein the determination of whether the first chunk is a standard chunk type or a nonstandard chunk type is performed by a classifier module that at least partially includes a computer processor.

16. The method of claim 1, wherein the step of separating the first document into multiple chunks of text is performed automatically by a chunk separator module that at least partially includes a computer processor.

17. The method of claim 1, further comprising:
receiving the first document; and
storing the first document in storage media.

18. The method of claim 1, wherein the nonstandard chunk type is a chunk that was generated via a second large language model.

* * * * *